United States Patent
Huang

(10) Patent No.: US 11,258,894 B2
(45) Date of Patent: Feb. 22, 2022

(54) PROFILE PICTURE DISPLAY METHOD AND TERMINAL

(71) Applicant: Huawei Technologies Co., Ltd., Shenzhen (CN)

(72) Inventor: Yan Huang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/644,910

(22) PCT Filed: Sep. 7, 2017

(86) PCT No.: PCT/CN2017/100956
§ 371 (c)(1),
(2) Date: Mar. 5, 2020

(87) PCT Pub. No.: WO2019/047130
PCT Pub. Date: Mar. 14, 2019

(65) Prior Publication Data
US 2020/0267252 A1    Aug. 20, 2020

(51) Int. Cl.
*G06F 16/58* (2019.01)
*H04M 3/42* (2006.01)
*H04M 1/72436* (2021.01)
*H04M 1/27475* (2020.01)
*H04M 1/72469* (2021.01)

(52) U.S. Cl.
CPC .... *H04M 1/72436* (2021.01); *G06F 16/5866* (2019.01); *H04M 1/27475* (2020.01); *H04M 1/72469* (2021.01); *H04M 3/42365* (2013.01)

(58) Field of Classification Search
CPC ......... H04M 1/72436; H04M 1/72469; H04M 1/27475; H04M 3/42365; G06F 16/5866; G06F 16/587; G06F 16/535
See application file for complete search history.

(56) References Cited

U.S. PATENT DOCUMENTS

| | | | |
|---|---|---|---|
| 2010/0017470 A1* | 1/2010 | Hyoung | H04L 51/04 709/204 |
| 2010/0306708 A1* | 12/2010 | Trenz | G06F 3/0482 715/853 |
| 2011/0122219 A1 | 5/2011 | Kim et al. | |
| 2014/0157153 A1 | 6/2014 | Yuen et al. | |
| 2015/0117444 A1 | 4/2015 | Sandblad et al. | |

FOREIGN PATENT DOCUMENTS

| | | |
|---|---|---|
| CN | 103118355 A | 5/2013 |
| CN | 104935497 A | 9/2015 |
| CN | 104951500 A | 9/2015 |

* cited by examiner

*Primary Examiner* — Joseph E Dean, Jr.
(74) *Attorney, Agent, or Firm* — Slater Matsil, LLP

(57) ABSTRACT

A method includes: receiving, by a first terminal, first input, where the first input is used to instruct the first terminal to display a first screen that includes a profile picture of a first user, and the first user is an owner of the first terminal or a contact saved on the first terminal; and searching, by the first terminal in response to the first input, for a profile picture of the first user and that corresponds to current scenario information of the first user; and displaying, by the first terminal in response to the first input, the first screen that includes a first profile picture.

15 Claims, 24 Drawing Sheets

PROFILE PICTURE DISPLAY METHOD AND TERMINAL

CROSS-REFERENCE TO RELATED APPLICATIONS

This application is a National Stage of International Application No. PCT/CN2017/100956, filed on Sep. 7, 2017, which is hereby incorporated by reference in its entirety.

TECHNICAL FIELD

This application relates to the field of communications technologies, and in particular, to a profile picture display method and a terminal.

BACKGROUND

With development of electronic technologies, smart terminals (such as a smartphone or a tablet computer) have increasingly powerful functions, and users are becoming more dependent on their mobile phones in daily lives. For example, a contact screen of contacts on a mobile phone, a voice call screen of the mobile phone (including a screen for making an outgoing call from the mobile phone to another mobile phone, an incoming call screen of the mobile phone, and a screen for performing a voice call on the mobile phone), an SMS message screen, and the like can display a profile picture that is set by a user and that corresponds to a contact.

SUMMARY

This application provides a profile picture display method and a terminal, to dynamically refresh a profile picture of a contact on a contact screen, an SMS message screen, or a voice call screen.

According to a first aspect, this application provides a profile picture display method. The method includes: receiving, by a first terminal, first input, where the first input is used to instruct the first terminal to display a first screen that includes a profile picture of a first user, and the first user is an owner of the first terminal or a contact saved on the first terminal; and displaying, by the first terminal in response to the first input, the first screen that includes a first profile picture, where the first profile picture is a profile picture that is in the profile picture of the first user and that corresponds to current scenario information of the first user. The current scenario information of the first user includes at least one of current time information, current address information, and current status information of the first user. The current status information of the first user includes at least one of current motion information and current emotion information of the first user. The first screen is any one of a contact screen, an SMS message screen, or a voice call screen.

In this application, when the first terminal displays, in response to the first input, the first screen that includes the profile picture of the first user (in other words, dynamically refreshes the contact screen, the SMS message screen, or the voice call screen), the first terminal may display, on the first screen, the profile picture that is in a plurality of profile pictures of the first user and that corresponds to the current scenario information of the first user. In other words, the first terminal may dynamically refresh a profile picture of the contact on the contact screen, the SMS message screen, or the voice call screen.

In a possible design method, the first terminal may save at least two profile pictures of the first user and scenario information corresponding to each profile picture. The first profile picture is one of the at least two profile pictures. In other words, the first terminal may save a plurality of profile pictures of the owner and scenario information corresponding to each profile picture in the plurality of profile pictures. The first terminal may save a plurality of profile pictures of each contact on the first terminal and scenario information corresponding to each of the plurality of profile pictures.

The first terminal saves the plurality of profile pictures of the first user and scenario information corresponding to each profile picture. Therefore, when displaying the first screen, the first terminal may select, from the plurality of profile pictures of the first user, the profile picture corresponding to the current scenario information. In other words, the first terminal may dynamically refresh the profile picture of the contact on the contact screen, the SMS message screen, or the voice call screen.

In another possible design method, the at least two profile pictures of the first user and the scenario information corresponding to each profile picture may be information that is set by the user and that is received by the first terminal on a second screen (namely, a profile picture setting screen). Specifically, before the "receiving, by a first terminal, first input", the method in this application further includes: displaying, by the first terminal, a second screen, where the second screen includes a profile picture selection option and at least one scenario setting option of the first user, the profile picture selection option is used to set a profile picture for the first user, and the at least one scenario setting option is used to set scenario information corresponding to the profile picture set for the first user; and in response to input of a user for the profile picture selection option and the at least one scenario setting option, saving, by the first terminal, the profile picture set for the first user and the scenario information corresponding to the profile picture set for the first user.

In this application, the first terminal may provide, for the user, the profile picture setting screen (namely, the second screen) used to set "the at least two profile pictures of the first user and the scenario information corresponding to each profile picture." In this way, the user may set, on the second screen based on a habit, a preference, or another requirement, profile pictures displayed on different scenarios for the user or a contact.

In another possible design method, the first screen is a voice call screen used by the first terminal to perform voice communication with a second terminal, and the first profile picture is a profile picture of an owner of the second terminal. In a process in which the first terminal performs voice communication with the second terminal on the voice call screen, the first terminal may further receive a profile picture shared by the second terminal. Specifically, after the "displaying, by the first terminal in response to the first input, the first screen that includes a first profile picture", the method in this application further includes: receiving, by the first terminal, a second profile picture of the owner of the second terminal that is sent by the second terminal; and displaying, by the first terminal in response to receiving the second profile picture of the owner of the second terminal, the first screen that includes the second profile picture.

In this application, in the process in which the first terminal performs voice communication with the second terminal, the first terminal may not only refresh the profile picture (namely, the profile picture of the owner of the second terminal) displayed on the voice call screen of the first terminal in real time based on the current scenario information, but also receive and display the profile picture pushed by the second terminal.

In another possible design method, after receiving the second profile picture sent by the second terminal, the first terminal may not immediately display the first screen that includes the second profile picture, but display a third screen that includes first prompt information, so that the user selects whether to set the second profile picture as a profile picture of a first contact.

Specifically, the displaying, by the first terminal in response to receiving the second profile picture of the owner of the second terminal, the first screen that includes the second profile picture includes: displaying, by the first terminal in response to receiving the second profile picture, the third screen that includes the first prompt information, where the first prompt information is used to prompt the user whether to set the second profile picture as the profile picture of the owner of the second terminal; and displaying, by the first terminal in response to second input of the user for the first prompt information on the third screen, the first screen that includes the second profile picture, where the second input is used to instruct the first terminal to refresh the first profile picture to the second profile picture.

After the first terminal receives the second profile picture pushed by the second terminal, the owner of the first terminal may not want to switch the profile picture of the owner of the second terminal from the first profile picture to the second profile picture. Based on such consideration, in this application, after receiving the second profile picture pushed by the second terminal, the first terminal may determine, according to selection of the user, whether to switch the profile picture of the owner of the second terminal. In this way, the profile picture of the owner of the second terminal displayed on the first terminal better suits preference of the owner of the first terminal, and this improves user experience.

In another possible design method, the first screen is a voice call screen used by the first terminal to perform voice communication with at least one second terminal, and the first profile picture may be a profile picture of an owner of the second terminal. In other words, the first user may include the owner of the second terminal that performs voice communication with the first terminal.

Optionally, the first screen is a voice call screen used by the first terminal to perform voice communication with a second terminal, and the first profile picture included by the first screen is a profile picture of an owner of the second terminal.

Optionally, the first screen is a voice call screen used by the first terminal to perform voice communication with a plurality of second terminals (namely, at least two second terminals). The first profile picture included by the first screen includes profile pictures of owners of all the second terminals in the plurality of second terminals. Alternatively, the first profile picture included by the first screen is a profile picture of a preset owner in owners of the plurality of second terminals.

In this design method, in a process in which the first terminal displays the first screen (namely, the voice call screen used by the first terminal to perform voice communication with the second terminal), the first terminal may further share the profile picture of the owner of the first terminal with the second terminal.

Optionally, in a process in which the first terminal performs voice communication with the at least one second terminal, the profile picture sent by the first terminal to the second terminal is a profile picture that is in the profile picture of the owner of the first terminal and that corresponds to the current scenario information of the owner of the first terminal. Specifically, after the "displaying, by the first terminal in response to the first input, the first screen that includes a first profile picture", the method in this application further includes: sending, by the first terminal to the second terminal in response to third input of the user on the first screen, the profile picture that is in the profile picture of the owner of the first terminal and that corresponds to the current scenario information of the owner of the first terminal.

In a process in which the first terminal performs a voice call with the at least one second terminal, the profile picture sent by the first terminal to each second terminal is "the profile picture that is in the profile picture of the owner of the first terminal and corresponds to the current scenario information of the owner of the first terminal", and is a same profile picture. In other words, each second terminal may receive the same profile picture sent by the first terminal.

Optionally, in the process in which the first terminal performs voice communication with the at least one second terminal, the first terminal may send a different profile picture to each second terminal. Specifically, the current scenario information of the first user includes at least one of the current time information and the current address information of the first user. After the "displaying, by the first terminal in response to the first input, the first screen that includes a first profile picture", the method in this application further includes: sending, by the first terminal to the second terminal in response to third input of the user on the first screen, a profile picture that is in the profile picture of the owner of the first terminal and that corresponds to current scenario information of the owner of the second terminal.

The profile picture sent by the first terminal to the second terminal is usually viewed by the owner of the second terminal. The second terminal sends, to each second terminal, the profile picture corresponding to the current scenario information of the owner of the second terminal. Therefore, this can better suit preference of the owner of the second terminal, and improve user experience.

According to the profile picture display method provided in this application, in the process in which the first terminal performs voice communication with the second terminal, the first terminal may receive the second profile picture sent by the second terminal, and send the profile picture of the owner of the first terminal to the second terminal. In other words, the first terminal and the second terminal may share their respective profile pictures in the voice communication process in this application.

In another possible design method, the current scenario information of the first user includes the current time information and the current address information of the first user. The time information includes specific time information, day time information, month time information, and year time information. The specific time information includes at least a special date, a holiday, and a solar term that are set by the user, and a priority of the specific time information is D1. The day time information includes a plurality of fixed periods of one day, and a priority of the day time information is D2. The month time information includes a plurality of fixed periods of one month, and a priority of the month time information is D3. The year time information includes at least each month and each quarter of one year, and a priority of the year time information is D4. D1>D2>D3>D4. The address information includes at least two levels of address range information, and priorities of the at least two levels of address range information decrease in ascending order of address ranges. The "displaying, by the first terminal in response to the first input, the first screen that includes a first profile picture" includes: in response to the first input, sequentially searching, by the first terminal in descending order of priorities of the time information and the address information, for the first profile picture that is in the profile picture of the first user and that corresponds to the current scenario information, and displaying the first screen that includes the first profile picture after finding the first profile picture for the first time.

In this application, in response to the first input, the first terminal may sequentially match, in descending order of the priorities of the time information and the address information, for the first profile picture that is in the profile picture of the first user and that corresponds to the current scenario information, and display the first screen that includes the first profile picture. The time information is used as an example. A higher priority of the time information indicates a smaller time range of the time information. Therefore, the first terminal may first search, in descending order of the priorities of the time information, for the first profile picture corresponding to time information with a high priority, in other words, the first profile picture corresponding to time information with a relatively small time range. In this way, the first terminal may quickly find the first profile picture corresponding to the small time range without reducing a large time range level by level.

In another possible design method, the time information may be classified into the time information with a plurality of priorities, the address information includes the at least two levels of address range information, and the time information and the address information may also have priorities. This can avoid a case in which the first terminal cannot normally obtain the first profile picture when current time information and current address information of the terminal located at a time point and in a location correspond to different profile pictures.

Specifically, in response to the first input, the sequentially searching, by the first terminal in descending order of priorities of the time information and the address information, for the first profile picture that is in the profile picture of the first user and that corresponds to the current scenario information, and displaying the first screen that includes the first profile picture after finding the first profile picture for the first time includes: in response to the first input, when the priority of the time information is higher than the priority of the address information, sequentially searching, by the first terminal in descending order of the priorities of the time information, for the first profile picture that is in the profile picture of the first user and that corresponds to the current time information, and displaying the first screen that includes the first profile picture after finding the first profile picture for the first time; and when the priority of the address information is higher than the priority of the time information, sequentially searching, by the first terminal in descending order of the priorities of the address information, for the first profile picture that is in the profile picture of the first user and that corresponds to the current address information, and displaying the first screen that includes the first profile picture after finding the first profile picture for the first time.

In this application, before searching for the first profile picture in descending order of the priorities of the time information and the address information, the first terminal may first determine the priorities of the time information and the address information, and search for the first profile picture based on information with a higher priority (the time information or the address information) in the priorities arranged in descending order. This can avoid a case in which the first terminal cannot normally obtain the first profile picture when current time information and current address information of the terminal located at a time point and in a location correspond to different profile pictures.

In another possible design method, in the process in which the first terminal performs voice communication with the second terminal, the current scenario information of the first terminal or the second terminal may change. The change in the scenario information herein in this application relates to changes in the time information, the address information, and the motion information or the emotion information. Specifically, after the "displaying, by the first terminal in response to the first input, the first screen that includes a first profile picture", the method in this application further includes: displaying, by the first terminal after detecting that the current scenario information of the first user changes, the first screen that includes a third profile picture, where the third profile picture is a profile picture that is in the profile picture of the first user and that corresponds to changed scenario information. In this application, the first profile picture displayed on the first screen may dynamically change as the current scenario information changes. In other words, the first terminal may dynamically refresh the profile picture of the contact on the contact screen, the SMS message screen, or the voice call screen.

In another possible design method, the first profile picture on the voice call screen used by the first terminal to perform voice communication with the at least two second terminals is the profile picture of the owner of the second terminal.

To avoid a case in which when the first terminal detects that the current scenario information of the first user changes and the first terminal receives the second profile picture sent by the second terminal, the first terminal cannot determine that the first terminal needs to display "a profile picture corresponding to changed scenario information", or display "the second profile picture pushed by the second terminal", the first terminal may set that in the voice communication process, a priority of a profile picture pushed by a peer end is higher than a priority of the profile picture corresponding to the changed scenario information in this application. Specifically, after the "displaying, by the first terminal in response to the first input, the first screen that includes a first profile picture", the method in this application further includes: after detecting, by the first terminal, that the current scenario information of the first user changes, and receiving, by the first terminal, the second profile picture of the owner of the second terminal that is sent by the second terminal, displaying, by the first terminal in response to receiving the second profile picture of the owner of the second terminal, the first screen that includes the second profile picture.

According to a second aspect, this application provides a terminal. The terminal is the first terminal in the first aspect and any possible design method of the first aspect, and the terminal includes an input unit and a display unit. The input unit is configured to receive first input, where the first input is used to instruct the first terminal to display a first screen that includes a profile picture of a first user, and the first user is an owner of the first terminal or a contact saved on the first terminal. The display unit is configured to display, in response to the first input, the first screen that includes a first profile picture, where the first profile picture is a profile picture that is in the profile picture of the first user and that corresponds to current scenario information of the first user;

the current scenario information of the first user includes at least one of current time information, current address information, and current status information of the first user; the current status information of the first user includes at least one of current motion information and current emotion information of the first user; and the first screen is any one of a contact screen, an SMS message screen, or a voice call screen.

In a possible design method, the terminal further includes a storage unit. The storage unit is configured to save at least two profile pictures of the first user and scenario information corresponding to each profile picture, and the first profile picture is one of the at least two profile pictures.

In another possible design method, the display unit is further configured to display, before the input unit receives the first input, a second screen, where the second screen includes a profile picture selection option and at least one scenario setting option of the first user, the profile picture selection option is used to set a profile picture for the first user, and the at least one scenario setting option is used to set scenario information corresponding to the profile picture set for the first user. The storage unit is further configured to: in response to input of a user for the profile picture selection option and the at least one scenario setting option that are displayed by the display unit, save the profile picture set for the first user and the scenario information corresponding to the profile picture set for the first user.

In another possible design method, the terminal further includes a first communications unit and a second communications unit. The first communications unit is configured to perform voice communication with a second terminal. The first screen displayed by the display unit is a voice call screen used by the first communications unit to perform voice communication with the second terminal, and the first profile picture is a profile picture of an owner of the second terminal. The second communications unit is configured to: after the display unit displays, in response to the first input, the first screen that includes the first profile picture, receive a second profile picture of the owner of the second terminal that is sent by the second terminal. The display unit is further configured to: in response to receiving, by the second communications unit, the second profile picture of the owner of the second terminal, display the first screen that includes the second profile picture.

In another possible design method, the display unit is further configured to: in response to receiving, by the second communications unit, the second profile picture, display a third screen that includes first prompt information, where the first prompt information is used to prompt the user whether to set the second profile picture as the profile picture of the owner of the second terminal; and in response to second input of the user for the first prompt information on the third screen, display the first screen that includes the second profile picture, where the second input is used to instruct the first terminal to refresh the first profile picture to the second profile picture.

In another possible design method, the first screen displayed by the display unit is a voice call screen used by the first communications unit of the first terminal to perform voice communication with at least one second terminal, and the first profile picture includes a profile picture of an owner of the second terminal that performs voice communication with the first terminal. The second communications unit is configured to: after the display unit displays, in response to the first input, the first screen that includes the first profile picture, send, to the second terminal in response to third input of the user on the first screen displayed by the display unit, a profile picture that is in the profile picture of the owner of the first terminal and that corresponds to current scenario information of the owner of the first terminal.

In another possible design method, the first screen displayed by the display unit is a voice call screen used by the first communications unit of the first terminal to perform voice communication with at least one second terminal, the first profile picture includes a profile picture of an owner of the second terminal that performs voice communication with the first terminal, and the current scenario information of the first user includes at least one of the current time information and the current address information of the first user. The second communications unit is configured to: after the display unit displays, in response to the first input, the first screen that includes the first profile picture, send, to the second terminal in response to third input of the user on the first screen displayed by the display unit, a profile picture that is in the profile picture of the owner of the first terminal and that corresponds to current scenario information of the owner of the second terminal.

In another possible design method, the current scenario information of the first user includes the current time information and the current address information of the first user. For a priority classification manner of the time information and the address information in the second aspect of this application, refer to detailed descriptions in the possible design method in the first aspect. Details are not described herein again. That the display unit, configured to display, in response to the first input, the first screen that includes the first profile picture includes: the display unit is configured to: in response to the first input, sequentially search, in descending order of priorities of the time information and the address information, for the first profile picture that is in the profile picture of the first user and that corresponds to the current scenario information, and display the first screen that includes the first profile picture after finding the first profile picture for the first time.

In another possible design method, the display unit is specifically configured to: in response to the first input, when the priority of the time information is higher than the priority of the address information, sequentially search, in descending order of the priorities of the time information, for the first profile picture that is in the profile picture of the first user and that corresponds to the current time information, and display the first screen that includes the first profile picture after finding the first profile picture for the first time; and when the priority of the address information is higher than the priority of the time information, sequentially search, in descending order of the priorities of the address information, for the first profile picture that is in the profile picture of the first user and that corresponds to the current address information, and display the first screen that includes the first profile picture after finding the first profile picture for the first time.

In another possible design method, the first screen displayed by the display unit is a voice call screen used by the first communications unit of the first terminal to perform voice communication with at least two second terminals, and the first profile picture is a profile picture of a preset owner in owners of the at least two second terminals.

In another possible design method, the display unit is further configured to: after displaying, in response to the first input, the first screen that includes the first profile picture, and after detecting that the current scenario information of the first user changes, display the first screen that includes a third profile picture, where the third profile picture is a profile picture that is in the profile picture of the first user and that corresponds to changed scenario information.

In another possible design method, the first screen is the voice call screen used by the first terminal to perform voice communication with the at least two second terminals, and the first profile picture is a profile picture of an owner of the second terminal; after the displaying, by the first terminal in response to the first input, the first screen that includes a first profile picture, the method further includes: after detecting, by the first terminal, that the current scenario information of the first user changes, and receiving, by the first terminal, a second profile picture of the owner of the second terminal that is sent by the second terminal, displaying, by the first terminal in response to receiving the second profile picture of the owner of the second terminal, the first screen that includes the second profile picture.

According to a third aspect, this application provides a graphical user interface (Graphical User Interface, GUI). The GUI is saved on a terminal; the terminal includes a touchscreen, a memory, a processor, and a communications interface. The processor is configured to execute one or more computer programs saved in the memory. The GUI includes: displaying on the touchscreen, in response to first input, a first screen that includes a first profile picture, where the first input is used to instruct the first terminal to display the first screen that includes a profile picture of a first user; the first user is an owner of the first terminal or a contact saved on the first terminal; the first profile picture is a profile picture that is in the profile picture of the first user and that corresponds to current scenario information of the first user; the current scenario information of the first user includes at least one of current time information, current address information, and current status information of the first user; the current status information of the first user includes at least one of current motion information and current emotion information of the first user; and the first screen is any one of a contact screen, an SMS message screen, or a voice call screen.

In a possible design method, the GUI further includes: before displaying the first screen on the touchscreen, displaying a second screen on the touchscreen, where the second screen includes a profile picture selection option and at least one scenario setting option of the first user, the profile picture selection option is used to set a profile picture for the first user, and the at least one scenario setting option is used to set scenario information corresponding to the profile picture set for the first user.

In another possible design method, the first screen is a voice call screen used by the communications interface to perform voice communication with a second terminal, and the first profile picture is a profile picture of an owner of the second terminal; and the GUI further includes: after displaying the first screen on the touchscreen, displaying on the touchscreen, in response to receiving a second profile picture of the owner of the second terminal, the first screen that includes the second profile picture.

In another possible design method, the GUI further includes: displaying on the touchscreen, in response to receiving the second profile picture, a third screen that includes first prompt information, where the first prompt information is used to prompt a user whether to set the second profile picture as the profile picture of the owner of the second terminal; and displaying on the touchscreen, in response to second input for the first prompt information on the third screen, the first screen that includes the second profile picture, where the second input is used to instruct the first terminal to refresh the first profile picture to the second profile picture.

In another possible design method, the first screen is a voice call screen used by the communications interface to perform voice communication with at least two second terminals, and the first profile picture is a profile picture of a preset owner in owners of the at least two second terminals.

In another possible design method, the GUI further includes: after displaying, on the touchscreen, the first screen that includes the first profile picture, if the processor detects that the current scenario information of the first user changes, displaying, on the touchscreen, the first screen that includes a third profile picture, where the third profile picture is a profile picture that is in the profile picture of the first user and that corresponds to changed scenario information.

In another possible design method, the first screen is the voice call screen used by the communications interface to perform voice communication with the at least two second terminals, the first profile picture is a profile picture of an owner of the second terminal, and the GUI further includes: after displaying, on the touchscreen, the first screen that includes the first profile picture, if the processor detects that the current scenario information of the first user changes, and the communications interface receives the second profile picture of the owner of the second terminal that is sent by the second terminal, displaying, on the touchscreen, in response to receiving, by the communications interface, the second profile picture of the owner of the second terminal, the first screen that includes the second profile picture.

According to a fourth aspect, this application provides a terminal. The terminal is the first terminal according to the first aspect or any one of the possible design methods of the first aspect. The terminal includes a processor, a memory, a touchscreen, and a communications interface. The memory, the touchscreen, and the communications interface are coupled to the processor. The memory is configured to store computer program code. The computer program code includes a computer instruction. When the processor executes the computer instruction, the terminal performs the profile picture display method according to the first aspect and any one of the possible design methods of the first aspect in this application. The communications interface is configured to communicate with another terminal. Specifically, the processor is configured to receive first input, where the first input is used to instruct the touchscreen to display a first screen that includes a profile picture of a first user, and the first user is an owner of the first terminal or a contact saved on the memory; and the touchscreen is configured to display, in response to the first input received by the processor, the first screen that includes a first profile picture, where the first profile picture is a profile picture that is in the profile picture of the first user and that corresponds to current scenario information of the first user; the current scenario information of the first user includes at least one of current time information, current address information, and current status information of the first user; the current status information of the first user includes at least one of current motion information and current emotion information of the first user; and the first screen is any one of a contact screen, an SMS message screen, or a voice call screen. Optionally, the processor may receive the first input of a user on the touchscreen.

In a possible design method, the memory is further configured to save at least two profile pictures of the first user and scenario information corresponding to each profile picture, and the first profile picture is one of the at least two profile pictures.

In another possible design method, the touchscreen is further configured to: before the processor receives the first input, display a second screen, where the second screen includes a profile picture selection option and at least one scenario setting option of the first user, the profile picture selection option is used to set a profile picture for the first user, and the at least one scenario setting option is used to set scenario information corresponding to the profile picture set for the first user; and the memory is further configured to: in response to input of the user for the profile picture selection option and the at least one scenario setting option, save the profile picture set for the first user and the scenario information corresponding to the profile picture set for the first user.

In another possible design method, the first screen displayed on the touchscreen is a voice call screen used by the communications interface to perform voice communication with a second terminal, and the first profile picture is a profile picture of an owner of the second terminal. In this case, the communications interface may be a radio frequency (Radio Frequency, RF) circuit of the terminal. The communications interface (for example, a wireless fidelity (Wireless Fidelity, Wi-Fi) module or a Bluetooth module of the terminal) may be configured to receive, in a process of displaying the first screen on the touchscreen, a second profile picture of the owner of the second terminal that is sent by the second terminal. The touchscreen is further configured to: in response to receiving, by the communications interface (for example, the Wi-Fi module or the Bluetooth module of the terminal), the second profile picture of the owner of the second terminal, display the first screen that includes the second profile picture.

In another possible design method, the touchscreen is further configured to: in response to receiving, by the communications interface, the second profile picture, display a third screen that includes first prompt information, where the first prompt information is used to prompt the user whether to set the second profile picture as the profile picture of the owner of the second terminal; and in response to second input of the user for the first prompt information on the third screen, display the first screen that includes the second profile picture, where the second input is used to instruct the first terminal to refresh the first profile picture to the second profile picture.

In another possible design method, the first screen displayed on the touchscreen is a voice call screen used by the communications interface to perform voice communication with at least one second terminal, and the first profile picture includes a profile picture of an owner of the second terminal that performs voice communication with the first terminal. The communications interface is further configured to: after the touchscreen displays, in response to the first input, the first screen that includes the first profile picture, send, to the second terminal in response to third input of the user on the first screen, a profile picture that is in the profile picture of the owner of the first terminal and that corresponds to current scenario information of the owner of the first terminal.

In another possible design method, the first screen displayed on the touchscreen is a voice call screen used by the communications interface to perform voice communication with at least one second terminal, the first profile picture includes a profile picture of an owner of the second terminal that performs voice communication with the first terminal, and the current scenario information of the first user includes at least one of the current time information and the current address information of the first user. The communications interface is further configured to: after the touchscreen displays, in response to the first input, the first screen that includes the first profile picture, send, to the second terminal in response to third input of the user on the first screen, a profile picture that is in the profile picture of the owner of the first terminal and that corresponds to current scenario information of the owner of the second terminal.

In another possible design method, the current scenario information of the first user includes the current time information and the current address information of the first user. For a priority classification manner of the time information and the address information in the second aspect of this application, refer to detailed descriptions in the possible design method in the first aspect. Details are not described herein again. The processor is further configured to: in response to the first input, sequentially search, in descending order of priorities of the time information and the address information, for the first profile picture that is in the profile picture of the first user and that corresponds to the current scenario information. The touchscreen is further configured to display the first screen that includes the first profile picture after the processor finds the first profile picture for the first time.

In another possible design method, the processor is further configured to: in response to the first input, determine that the priority of the time information is higher than the priority of the address information, or that the priority of the address information is higher than the priority of the time information. The processor is further configured to: when the priority of the time information is higher than the priority of the address information, sequentially search, in descending order of the priorities of the time information, for the first profile picture that is in the profile picture of the first user and that corresponds to the current time information; and when the priority of the address information is higher than the priority of the time information, sequentially search, in descending order of the priorities of the address information, for the first profile picture that is in the profile picture of the first user and that corresponds to the current address information. The touchscreen is further configured to display the first screen that includes the first profile picture after the processor finds the first profile picture for the first time.

In another possible design method, the first screen displayed on the touchscreen is a voice call screen used by the communications unit to perform voice communication with at least two second terminals. The first profile picture is a profile picture of a preset owner in owners of the at least two second terminals.

In another possible design method, the processor is further configured to: in response to the first input, detect whether the current scenario information of the first user changes after the first screen that includes the first profile picture is displayed. The touchscreen displays, after the processor detects that the current scenario information of the first user changes, the first screen that includes a third profile picture, where the third profile picture is a profile picture that is in the profile picture of the first user and that corresponds to changed scenario information.

In another possible design method, the first screen displayed on the touchscreen is the voice call screen used by the communications unit to perform voice communication with the at least two second terminals, and the first profile picture is a profile picture of an owner of the second terminal. The processor is further configured to detect, in response to the first input, whether the current scenario information of the first user changes after the first screen that includes the first profile picture is displayed. The communications interface is further configured to receive a second profile picture of the owner of the second terminal that is sent by the second terminal. The touchscreen is further configured to: after the processor detects that the current scenario information of the first user changes, and the communications interface receives the second profile picture of the owner of the second terminal that is sent by the second terminal; display, in response to receiving the second profile picture of the owner of the second terminal by the communications interface, the first screen that includes the second profile picture.

According to a fifth aspect, an embodiment of this application provides a computer storage medium. The computer storage medium includes a computer instruction. When the computer instruction runs on a terminal, the terminal (namely, the first terminal) is enabled to perform the profile picture display method according to any one of the possible design methods of the first aspect in this application.

According to a sixth aspect, an embodiment of this application provides a computer program product. When the computer program product runs on a computer, the computer is enabled to perform the profile picture display method according to any one of the possible design methods of the first aspect in this application.

It may be understood that, the terminals in the second aspect and the fourth aspect, the GUI in the third aspect, the computer storage medium in the fifth aspect, and the computer program product in the sixth aspect are all configured to perform the corresponding methods provided above. Therefore, for advantageous effects that the terminals, the GUI, the computer storage medium, and the computer program product can achieve, refer to advantageous effects in the corresponding methods provided above. Details are not described again herein.

DETAILED DESCRIPTION OF ILLUSTRATIVE EMBODIMENTS

The terms "first" and "second" mentioned below are merely intended for description, and shall not be understood as an indication or implication of relative importance or implicit indication of a quantity of indicated technical features. Therefore, a feature limited by "first" or "second" may explicitly or implicitly include one or more features. In the descriptions of this application, unless otherwise stated, "plurality" means at least two.

A profile picture set for each contact on a mobile phone is usually a fixed picture corresponding to a communication number (for example, a mobile phone number) of the contact. After a user sets a profile picture for a contact on a mobile phone, regardless of a scenario (a time or a location) in which the user or the contact is located, the mobile phone always displays the fixed profile picture set for the contact. User experience is comparatively poor.

This application provides a profile picture display method and a terminal. The method may be applied to a process in which the terminal displays a contact screen or the terminal performs voice communication. Specifically, the terminal may refresh a profile picture of a contact in real time on the contact screen or a voice call screen of the terminal based on current scenario information of a user, for example, time information and/or address information.

For example, a first terminal and a second terminal in this application may be a mobile phone, a wearable device, an augmented reality (augmented reality, AR)/a virtual reality (virtual reality, VR) device, a tablet computer, a notebook computer, an ultra-mobile personal computer (ultra-mobile personal computer, UMPC), a netbook, a personal digital assistant (personal digital assistant, PDA), or the like. A specific form of the device is not limited in this application.

For example, in an implementation, the profile picture display method provided in this application may be applied to a scenario in which the terminal (the first terminal or the second terminal) displays a profile picture of an owner of the terminal. For example, it is assumed that the terminal is a mobile phone 100. A "contact screen" 101 shown in (a) in FIG. 1 may include an "information option" 102 of an owner of the mobile phone 100, and the "information option" 102 includes a profile picture a of the owner. By using the method in this application, the profile picture of the owner of the terminal may be refreshed in real time based on current scenario information of the user.

Figure 1:
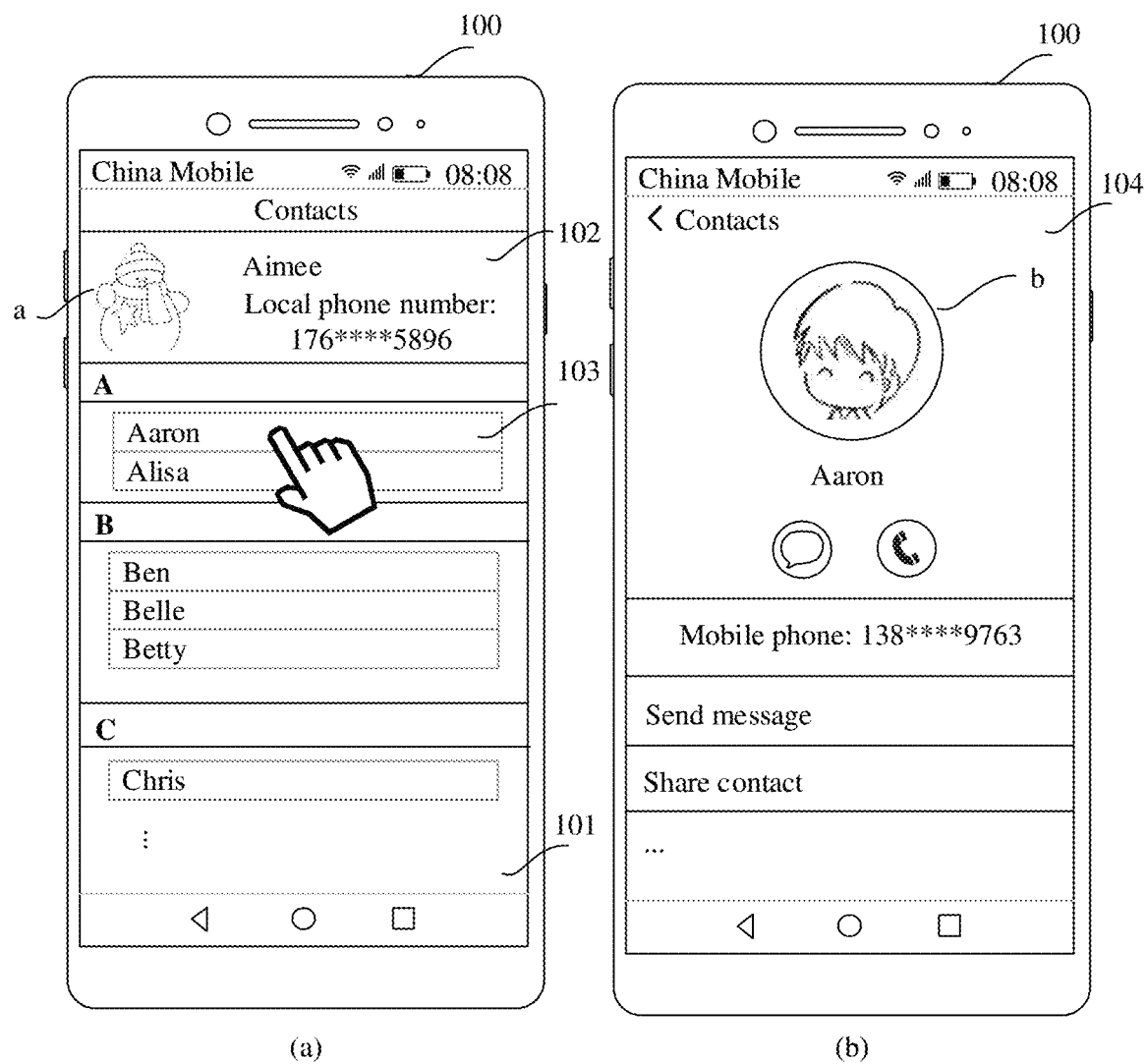
FIG. 1 is a schematic diagram 1 of an example of a display screen of a terminal according to this application.

In addition, the profile picture display method provided in this application may be further applied to a scenario in which the terminal displays a profile picture of a contact on the terminal. For example, it is assumed that the terminal is the mobile phone 100, and the "contact screen" 101 shown in (a) in FIG. 1 includes information options of a plurality of contacts, including an "Aaron (Aaron)'s contact information option" 103, a "contact information option of Alisa (Alisa)", a "contact information option of Ben (Ben)", and the like. The "contact information option of Aaron" 103 shown in (a) in FIG. 1 is used as an example. After the user taps the "contact information option of Aaron" 103 shown in (a) in FIG. 1, the mobile phone 100 may display a "contact screen" 104 shown in (b) in FIG. 1. The "contact screen" 104 includes an "Aaron's profile picture" b, an "Aaron's communication number 138****9763", another functional option, and the like. According to the method in this application, the profile picture of the contact on the first terminal may be refreshed in real time based on the current scenario information of the user.

In another implementation, the profile picture display method provided in this application may be further applied to a scenario in which the first terminal displays, on the voice call screen, a profile picture of a peer contact in voice communication in a voice communication process.

In some embodiments, the voice communication in this application may include voice communication performed in a process in which the first terminal makes a call or answers a call.

Figure 2:
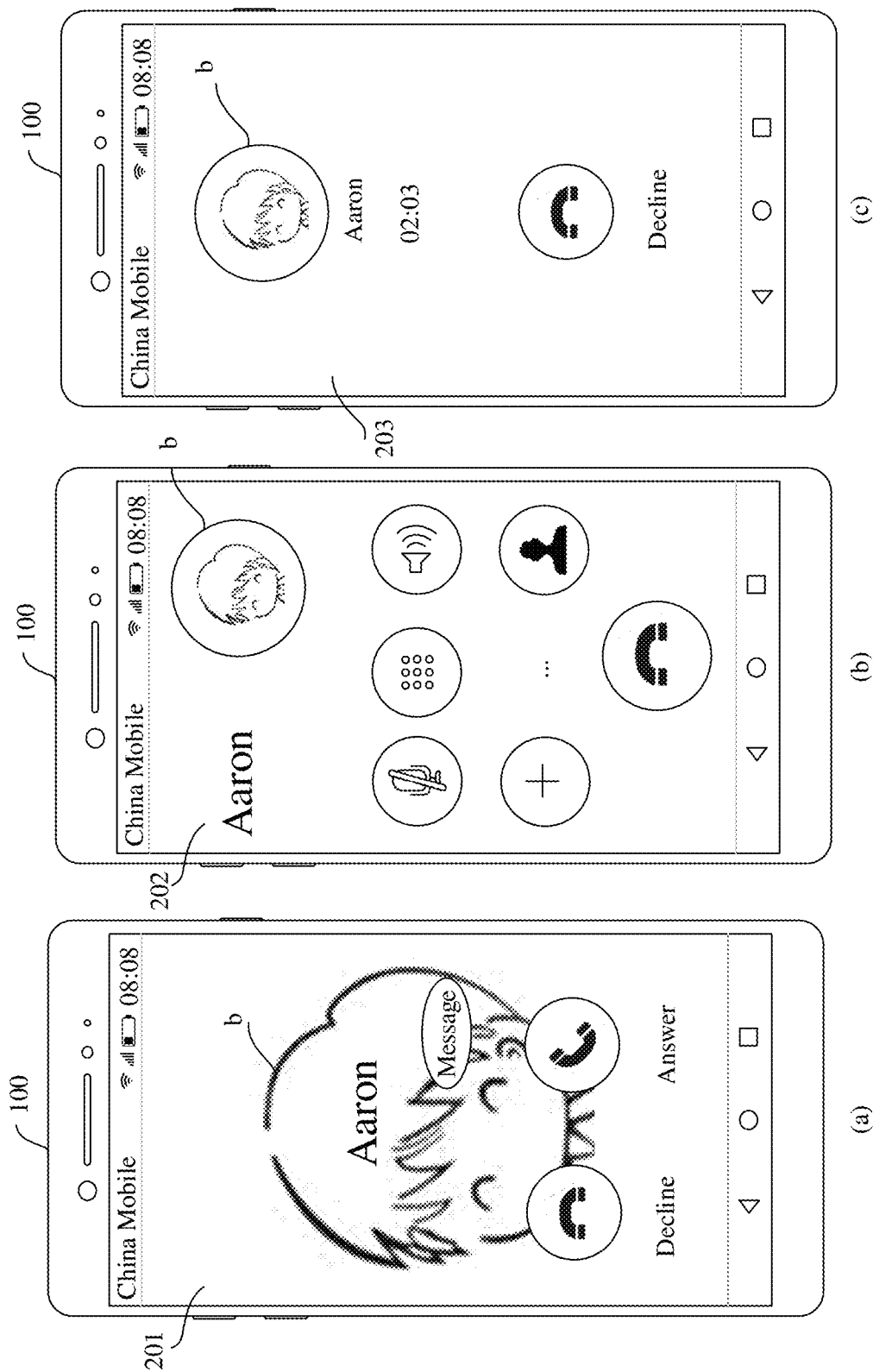
FIG. 2 is a schematic diagram 2 of an example of a display screen of a terminal according to this application.

For example, it is assumed that the first terminal is a mobile phone 100 shown in (a) in FIG. 2. (a) in FIG. 2 shows an incoming call notification screen 201 displayed after the mobile phone 100 receives an incoming call request initiated by the second terminal. The incoming call notification screen 201 may include a profile picture of a contact initiating the incoming call request, for example, the "Aaron's profile picture" b (namely, a profile picture b). According to the method in this application, the profile picture of the contact may be refreshed in real time based on the current scenario information of the user or current scenario information of the peer contact.

For example, (b) in FIG. 2 shows an outgoing call screen 202 in which the mobile phone 100 initiates an incoming call request to the second terminal, namely, the outgoing call screen 202 when the first terminal makes a call (calls another user) to the second terminal. The outgoing call screen 202 may include a profile picture of a user (a contact on the first terminal) called by the first terminal, for example, the "Aaron's profile picture" b. According to the method in this application, the profile picture of the contact may be refreshed in real time based on the current scenario information of the user or the current scenario information of the peer contact.

For example, (c) in FIG. 2 shows a voice call screen 203 when the mobile phone 100 makes a voice call with the second terminal. The voice call screen 203 may include a profile picture "Aaron's profile picture" b (namely, the profile picture b) of a contact that is performing a voice call with the first terminal. According to the method in this application, the profile picture of the contact may be refreshed in real time based on the current scenario information of the user or the current scenario information of the peer contact.

In some other embodiments, the voice communication in this application may further include: performing, by the first terminal, a voice call or a video call by using a third-party application (for example, WeChat, QQ, or another chat tool, and an application program for making a call).

Figure 3:
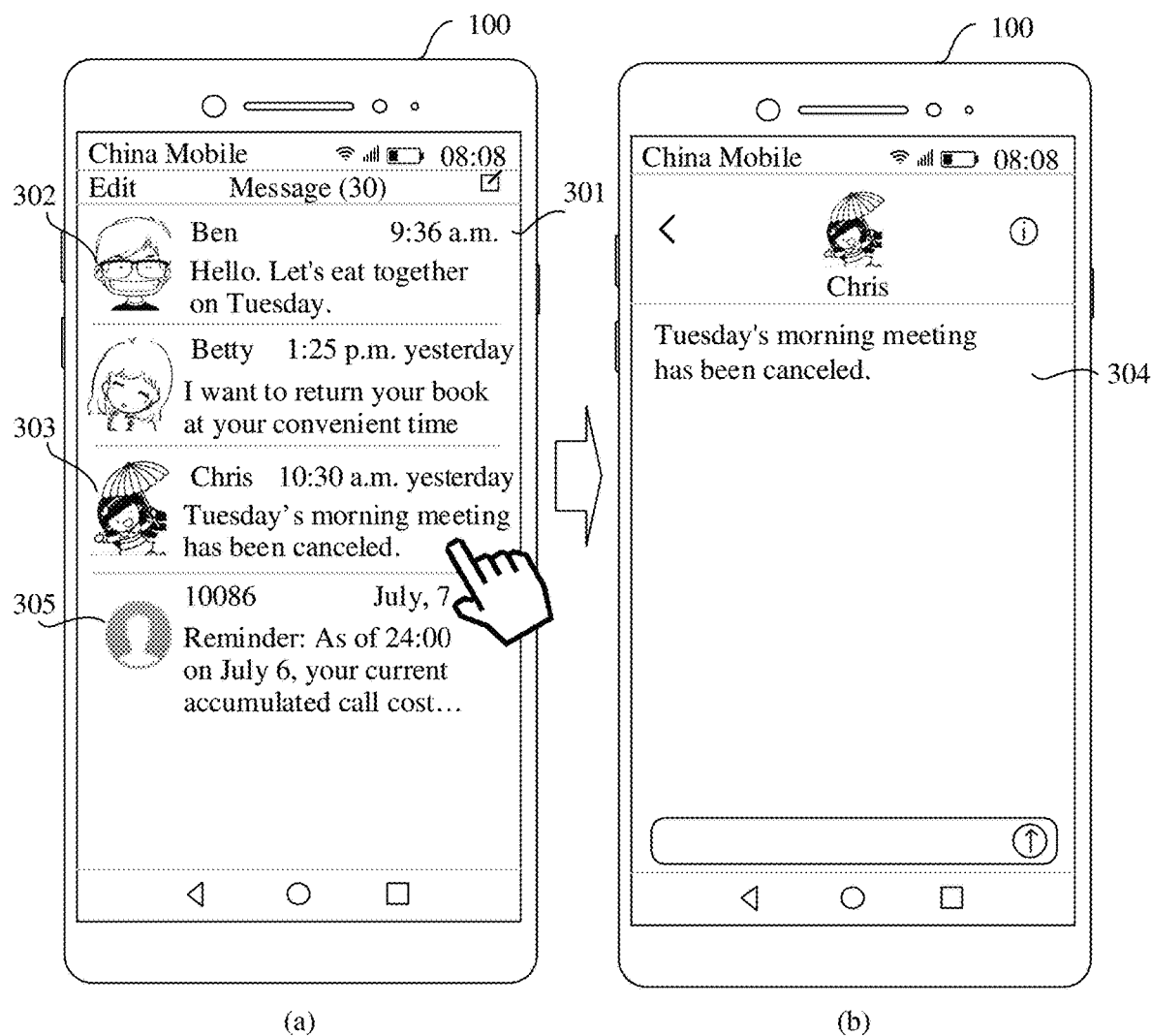
FIG. 3 is a schematic diagram 3 of an example of a display screen of a terminal according to this application.

In another implementation, the profile picture display method provided in this application may be applied to a scenario in which the first terminal displays, on an SMS message screen of the first terminal, a profile picture of a contact corresponding to an SMS message. For example, (a) in FIG. 3 shows an SMS message screen 301 of the mobile phone 100. The SMS message screen 301 includes an "SMS message record 302 between the mobile phone 100 and Ben", and an "SMS message record between the mobile phone 100 and Betty", an "SMS message record 303 between the mobile phone 100 and Chris", and the like. Each SMS message record includes a profile picture of a corresponding contact.

In addition, the profile picture display method provided in this application may be applied to a scenario in which the first terminal displays, on an SMS message details screen of the first terminal, a profile picture of a contact corresponding to an SMS message. The "SMS message record 303 between the mobile phone 100 and Chris" shown in (a) in FIG. 3 is used as an example. After the user taps the "SMS message record 303 between the mobile phone 100 and Chris" shown in (a) in FIG. 3, the mobile phone 100 may display an "SMS message details screen" 304 shown in (b) in FIG. 3. The "SMS message details screen" 304 includes a "Chris's profile picture", detailed content of an SMS message, another functional option, and the like.

According to the method in this application, the profile picture of the contact on the SMS message screen and the SMS message details screen may be refreshed in real time based on the current scenario information of the user.

It may be understood that application scenarios of the method provided in this application include but are not limited to the scenarios shown in FIG. 1 to FIG. 3. The method in this application may be applied to a scenario of refreshing profile pictures in all "display screens that include profile pictures of contacts and owners." Other application scenarios are not described one by one herein.

It should be noted that, in this application, a profile picture of any user is not limited to a portrait photo of the user, and the profile picture of the user may be an image that corresponds to the user (for example, a communication number of the user) and that is set on the first terminal. The image may include a portrait or may not include a portrait (for example, a landscape image and a cartoon animation image). The portrait may be a portrait photo of a corresponding user, or may be a portrait photo of another person (such as a celebrity's photo).

Figure 4:
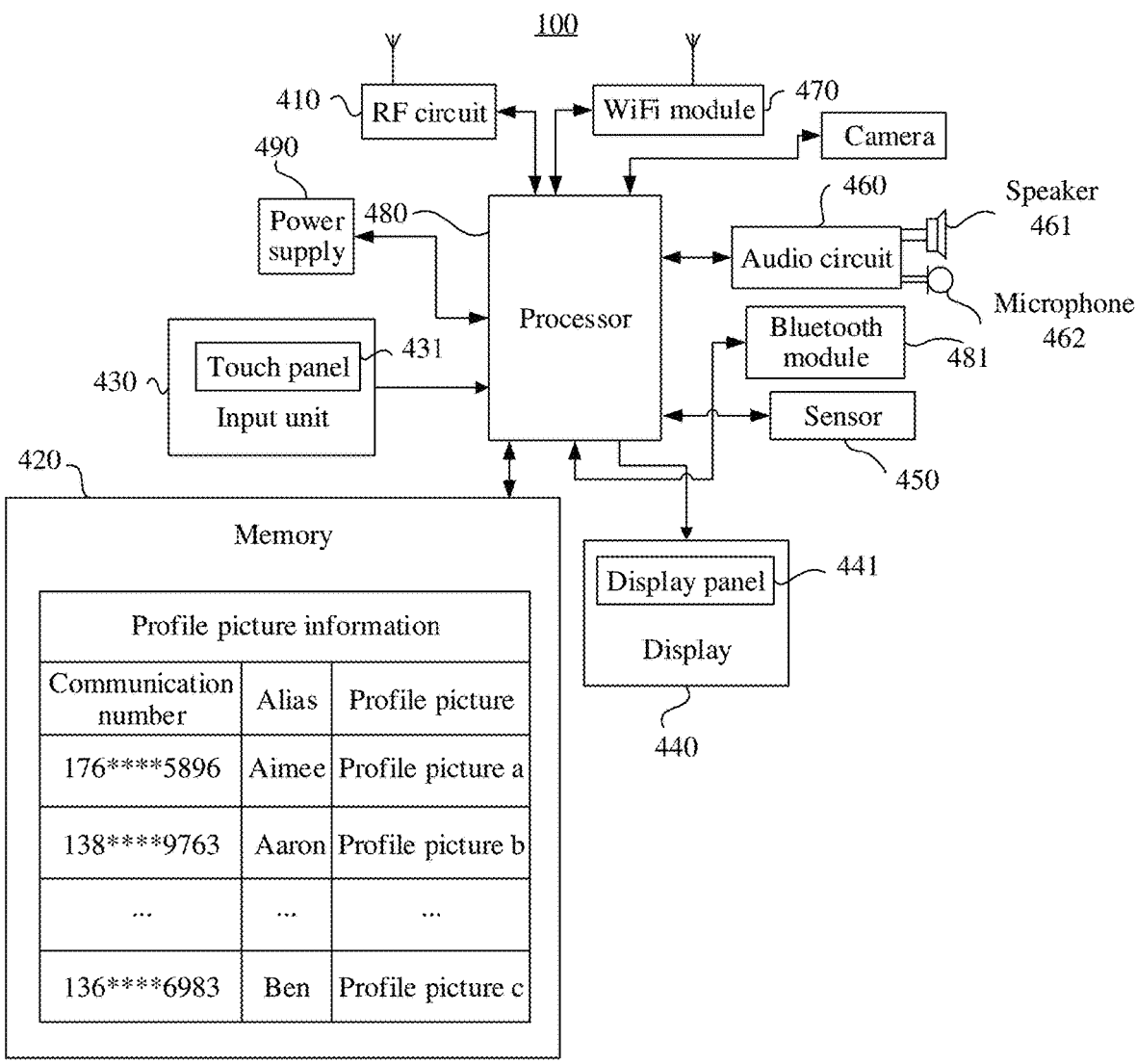
FIG. 4 is a schematic diagram of a hardware structure of a mobile phone according to this application.

Refer to FIG. 4. An example in which the first terminal is the mobile phone 100 is used herein to describe the first terminal provided in this application. It should be understood that the mobile phone 100 shown in FIG. 4 is only an example of the first terminal, and the mobile phone 100 may have more or fewer components than those shown in the figure, or a combination of two or more components, or components arranged in a different manner. Various components shown in FIG. 4 may be implemented in hardware, software, or in a combination of hardware and software that includes one or more signal processing and/or application-specific integrated circuits.

As shown in FIG. 4, the mobile phone 100 includes components such as an RF circuit 410, a memory 420, an input unit 430, a display 440, a sensor 450, an audio circuit

460, a Wi-Fi module 470, a processor 480, and a power supply 490. Persons skilled in the art may understand that the structure of the mobile phone shown in FIG. 4 does not constitute a limitation on the mobile phone, and the mobile phone may include more or fewer components than those shown in the figure, or a combination of some components, or components arranged in a different manner.

The following describes in detail the components of the mobile phone 100 with reference to FIG. 4.

The RF circuit 410 may be configured to receive and send signals in an information receiving and sending process or a call process. The RF circuit 410 may receive downlink information from a base station, transmit the downlink information to the processor 480 for processing, and send uplink data to the base station. Usually, the RF circuit includes but is not limited to devices such as an antenna, at least one amplifier, a transceiver, a coupler, a low noise amplifier, and a duplexer. In addition, the RF circuit 410 may further communicate with a network and another mobile device through wireless communication. The wireless communication may use any communications standard or protocol, including but not limited to global system for mobile communications, general packet radio service, code division multiple access, wideband code division multiple access, long term evolution, email, SMS message service, and the like.

The memory 420 may be configured to store a software program and data. The processor 480 runs the software program and the data stored in the memory 420, to perform various functions and data processing of the mobile phone 100. The memory 420 may mainly include a program storage area and a data storage area. The program storage area may store an operating system, an application program required by at least one function (such as a voice playing function and an image playing function), and the like. The data storage area may store data created based on use of the mobile phone 100, and the like.

For example, as shown in FIG. 4, the memory 420 saves profile picture information of a contact. The profile picture information of the contact may include a correspondence between a contact (for example, a communication number and/or an alias of the contact) and a profile picture of the contact, and a profile picture of the contact. For example, a profile picture of an owner Aimee whose communication number is 176**5896 is a profile picture a, a profile picture of a contact Aaron whose communication number is 1389763 is a profile picture b, and a profile picture of a contact Ben whose communication number is 136**6983 is a profile picture c.

In addition, the memory 420 may include a high-speed random access memory, or may include a non-volatile memory, for example, at least one magnetic disk storage device, a flash memory device, or another volatile solid-state storage device. In the following embodiments, the memory 420 stores an operating system that supports running of the mobile phone 100, for example, an iOS® operating system developed by Apple Inc., an Android® open-source operating system developed by Google LLC, and a Windows® operating system developed by Microsoft Corporation.

The input unit 430 (for example, a touchscreen) may be configured to: receive entered digit or character information, and generate a signal input related to user setting and function control of the mobile phone 100. Specifically, the input unit 430 may include a touch panel 431 disposed on a front side of the mobile phone 100. The touch panel 431 may collect a touch operation of the user on or near the touch panel 431 (for example, an operation performed by the user on or near the touch panel 431 by using any suitable object or accessory such as a finger or a stylus), and drive a corresponding connection apparatus according to a preset program. Optionally, the touch panel 431 may include two parts: a touch detection apparatus and a touch controller (not shown in FIG. 4). The touch detection apparatus detects a touch position of the user, detects a signal brought by a touch operation, and transfers the signal to the touch controller. The touch controller receives touch information from the touch detection apparatus, converts the touch information into coordinates of a touch point, sends the coordinates to the processor 480, and receives and executes a command sent by the processor 480. In addition, the touch panel 431 may be implemented by using a plurality of types such as a resistive type, a capacitive type, an infrared type, and a surface acoustic wave type.

The display 440 (namely, a display screen) may be configured to display information entered by the user or information provided for the user, and GUIs of various menus of the mobile phone 100. The display 440 may include a display panel 441 disposed on a front side of the mobile phone 100. The display panel 441 may be configured in a form of a liquid crystal display, a light-emitting diode, or the like.

In some embodiments, the mobile phone 100 includes a front side A and a back side B. An optical touch button is disposed at the bottom of the front side A. The touch panel 431 and the display panel 441 are further disposed, and the touch panel 431 covers the display panel 441. After detecting a touch operation on or near the touch panel 431, the touch panel 431 transfers the touch operation to the processor 480 to determine a touch event. Then, the processor 480 provides corresponding visual output on the display panel 441 based on a type of the touch event. In FIG. 1, the touch panel 431 and the display panel 441 are used as two separate parts to implement input and input functions of the mobile phone 100. However, in some embodiments, the touch panel 431 and the display panel 441 may be integrated to implement the input and output functions of the mobile phone 100. The touch panel 431 and the display panel 441 that are integrated may be referred to as a touchscreen.

In some other embodiments, a pressure sensor may further be disposed on the touch panel 431, so that the touch panel can further detect pressure of a touch operation when the user performs the touch operation on the touch panel. Therefore, the mobile phone 100 can more accurately detect the touch operation.

The mobile phone 100 may further include at least one sensor 450, for example, an optical sensor, a motion sensor, or another sensor. Specifically, the optical sensor may include an ambient light sensor and a proximity sensor. As shown in FIG. 1A, the ambient light sensor 451 may adjust luminance of the display panel 441 based on intensity of ambient light. An optical proximity sensor 452 is disposed on the front side of the mobile phone 100. When the mobile phone 100 is moved to an ear, the mobile phone 100 switches off the display panel 441 based on detection of the optical proximity sensor 452. This can further reduce power consumption of the mobile phone 100. As a type of motion sensor, an accelerometer sensor may detect a value of acceleration in each direction (usually on three axes), may detect a value and a direction of gravity in a stationary state, and may be used in an application for recognizing a mobile phone posture (such as screen switching between a landscape mode and a portrait mode, a related game, or magnetometer posture calibration), a function related to vibration recognition (such as a pedometer or a knock), or the like. Other sensors such as a gyroscope, a barometer, a hygrometer, a thermometer, or an infrared sensor may further be configured in the mobile phone 100. Details are not described herein.

The audio circuit 460, a speaker 461, and a microphone 462 may provide an audio interface between the user and the mobile phone 100. The audio circuit 460 may convert received audio data into an electrical signal and transmit the electrical signal to the speaker 461, and the speaker 461 converts the electrical signal into a sound signal for output. In addition, the microphone 462 converts a collected sound signal into an electrical signal. The audio circuit 460 receives and converts the electrical signal into audio data, and outputs the audio data to the RF circuit 410 to send the audio data to, for example, another mobile phone, or outputs the audio data to the memory 420 for further processing.

Wi-Fi is a short-distance wireless transmission technology. With the Wi-Fi module 470, the mobile phone 100 may help the user send and receive an email, browse a web page, access streaming media, and the like. The Wi-Fi module 470 provides wireless access to the broadband internet for the user.

The processor 480 is a control center of the mobile phone 100, and is connected to various parts of the entire phone by using various interfaces and lines. By running or executing the software program stored in the memory 420 and invoking the data stored in the memory 420, the processor 480 performs various functions and data processing of the mobile phone 100, to perform overall monitoring on the phone. In some embodiments, the processor 480 may include one or more processing units. An application processor and a modem processor may be further integrated into the processor 480. The application processor mainly processes an operating system, a user interface, an application program, and the like. The modem processor mainly processes wireless communication. It may be understood that the modem processor may not be integrated into the processor 480.

A Bluetooth module 481 is configured to exchange information with another device by using a short-range communications protocol such as Bluetooth. For example, the mobile phone 100 may establish, by using the Bluetooth module 481, a Bluetooth connection to a wearable electronic device (for example, a smart watch) that also has a Bluetooth module, to exchange data.

The mobile phone 100 further includes the power supply 490 (for example, a battery) that supplies power to the components. The power supply may be logically connected to the processor 480 by using a power management system, to perform functions such as charging, discharging, and power consumption management by using the power management system. It may be understood that, in the following embodiments, the power supply 490 may be configured to supply power to the display panel 441 and the touch panel 431.

All methods in the following embodiments may be implemented on the mobile phone 100 having the foregoing hardware structure.

Figure 5A:
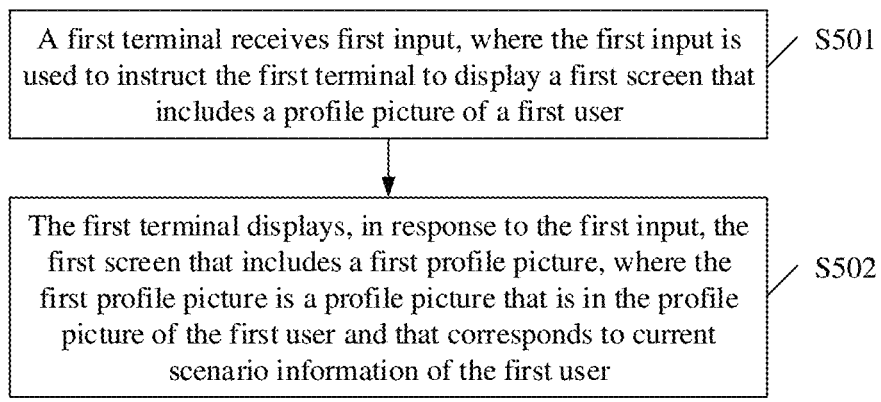
FIG. 5A is flowchart 1 of a profile picture display method according to this application.

This application provides a profile picture display method. As shown in FIG. 5A, the profile picture display method may include S501 and S502.

S501: A first terminal receives first input, where the first input is used to instruct the first terminal to display a first screen that includes a profile picture of a first user.

The first user may be an owner of the first terminal or a contact saved on the first terminal, or the first user may include the owner of the first terminal and the contact saved on the first terminal.

For example, the first user is the owner of the first terminal in a first application scenario of this application. The first input may be an instruction of a user to start a "contact screen" of the first terminal. For example, it is assumed that the first terminal is the mobile phone 100 shown in FIG. 5B, and the first input may be an instruction triggered by a tap operation performed by the user on an icon 601 of a "contacts" application shown in (a) in FIG. 5B.

Correspondingly, the first screen may be the "contact screen" of the first terminal, and the "contact screen" includes a profile picture of the owner of the first terminal (namely, a profile picture of the first user). For example, the first screen may be the "contact screen" 101 shown in (a) in FIG. 1, and the profile picture may be a profile picture a of the owner.

In a second application scenario of this application, the first user may be the contact saved on the first terminal. The first input may also be the instruction of the user to start the "contact screen" of the first terminal. For example, the first input may be an instruction generated after the user taps the "Aaron (Aaron)'s contact information option" 103 shown in (a) in FIG. 1. Alternatively, the first input may be an instruction generated after the user taps an "Aaron's contact information option" 501 shown in (b) in FIG. 5B.

Correspondingly, the first screen may be the "contact screen" of the first terminal, and the "contact screen" includes a profile picture of the contact on the first terminal (namely, the profile picture of the first user). For example, the first screen may alternatively be the "contact screen" 104 shown in (b) in FIG. 1, and the profile picture of the contact (the first user) may be the "Aaron's profile picture" b. Alternatively, the first screen may be a "contact screen" shown in (c) in FIG. 5B, and the profile picture of the contact (the first user) may be an "Aaron's profile picture" d.

In a third application scenario of this application, the first input may be a paging instruction received by the first terminal. After receiving the paging instruction that is forwarded by a base station to the first terminal and obtaining incoming call information (for example, an incoming call number), the first terminal may display an "incoming call notification screen." Correspondingly, the first screen is the "incoming call notification screen" of the first terminal. For example, the first screen is an "incoming call notification screen" 601 shown in (a) in FIG. 6, and the "incoming call notification screen" 601 includes a profile picture of a contact that initiates an incoming call request, for example, the "Aaron's profile picture" b. Alternatively, the first screen may be an "incoming call notification screen" 602 shown in (b) in FIG. 6, and the "incoming call notification screen" 602 includes a profile picture of a contact that initiates an incoming call request, for example, the "Aaron's profile picture d."

Optionally, the first input may be a dialing instruction triggered by the user on a dialer screen of the first terminal, and the first screen may be a display screen shown in (b) in FIG. 2. Alternatively, the first input may be an instruction triggered by a tap operation performed by the user on an "answer" button on the "incoming call notification screen" of the first terminal shown in (a) or (b) in FIG. 6, and the first screen may be a display screen shown in (c) in FIG. 2.

Alternatively, the first input may be an instruction used to instruct the first terminal to display the "SMS message screen" 301 shown in (a) in FIG. 3, and the first screen may be the "SMS message screen" 301 shown in (a) in FIG. 3. Alternatively, the first input may be an instruction triggered by the user by performing a tapping operation on an "SMS message option" 303 shown in (a) in FIG. 3, and the first screen may be a display screen 304 shown in (b) in FIG. 3.

It should be noted that the first input and the first screen in this application include but are not limited to the first input and the first screen examples described above. The first screen in this application may be any display screen that includes a profile picture of an owner and/or a profile picture of a contact, and the first input is an instruction or a user operation that is used to instruct the first terminal to display the first screen.

S502: The first terminal displays, in response to the first input, the first screen that includes a first profile picture, where the first profile picture is a profile picture that is in the profile picture of the first user and that corresponds to current scenario information of the first user.

The first terminal may save at least two profile pictures of the first user and scenario information corresponding to each profile picture. The first profile picture is one of the at least two profile pictures.

The current scenario information of the first user may include at least one of current time information, current address information, and current status information of the first user. The current status information of the first user includes at least one of current motion information and current emotion information of the first user.

When the first user is the owner of the first terminal, the current motion information of the first user may be collected by the first terminal by using a motion sensor, and the current emotion information of the first user may be emotion information determined by the first terminal based on a facial expression of the first user that is collected by a camera. When the first user is contact information on the first terminal, the current motion information and the current emotion information of the first user may be information that is received by the first terminal and that is sent and collected by a terminal of the contact.

For example, it is assumed that the scenario information may include the current time information and the current address information of the first user, the first terminal saves three profile pictures of the first user: a profile picture a, a profile picture b, and a profile picture c, and the current scenario information includes current time information and current address information of the first user. In addition, the profile picture a may correspond to afternoon (current time information) and a company (current address information), the profile picture b may correspond to noon (current time information) and home (current address information), and the profile picture c may correspond to morning (current time information) and home (current address information). In this case, if the first terminal obtains, in response to the first input in the morning, that the current address information of the first user is home, the first terminal may display the first screen that includes the profile picture c.

It should be noted that the "current address information of the first user" in this application may be information about a current location of the first user. The first terminal may obtain the location information of the first user in real time. Certainly, the "current address information of the first user" may alternatively be a name of a fixed place that is determined after the first terminal classifies the obtained location information. For example, when a distance between the current location of the first user and a home address of the first user is less than a threshold, it may be determined that the "current address information of the first user" is home of the first user.

A manner of classifying the time information in this application includes but is not limited to the "morning, noon, and afternoon." The time information may be classified in at least one of the following manners:

(1) Semi-annual: The first half of a year may be from January 1 to June 30 each year; the second half of the year may be from July 1 to December 31 each year.

(2) Four seasons of a year: spring, summer, autumn, and winter.

(3) A period of 10 days in a month: The first ten-day period of a month may be from the 1st day to the 10th day of the month; the middle ten-day period of the month may be from the 11th day to the 10th day of the month; the last ten-day period of the month may be from the 21st day to the end of the month.

(4) Periods of a day: The beginning of the day may be a period from 01:01 to 04:59 of the day; the early morning may be a period from 05:05 to 05:59 of the day; the mid morning may be a period from 06:00 to 08:00; the late morning may be a period from 08:01 to 10:59; the noon may be a period from 11:00 to 12:59; the afternoon may be a period from 13:00 to 17:00; the evening may be a period from 17:01 to 18:00; the night may be a period from 18:01 to 23:59; the midnight may be a period from 00:00 to 01:00 of the second day.

(5) 24 solar terms: start of spring, rain water, awakening of insects, vernal equinox, clear and bright, grain rain, start of summer, small full (grain), grain in ear, summer solstice, minor heat, major heat, start of autumn, limit of heat, white dew, autumnal equinox, cold dew, frost descent, start of winter, minor snow, major snow, winter solstice, minor cold, and major cold.

(6) Holiday: new year's day, spring festival, qingming festival, labor day, dragon boat festival, national day, mid-autumn festival, christmas, halloween, easter day, valentine's day, mother's day, and father's day.

(7) Special date: for example, a birthday or a wedding anniversary of the first user (the owner or the contact).

The address information may be classified in at least one of the following manners:

(1) Tourist destinations: Sanya, Great Wall, forbidden city, Yangshuo in Guilin, west lake in Hangzhou, terra-cotta warriors in Xi'an, mount Huangshan in Anhui, and the like.

(2) Places where the first user often visits: home, office, and the like.

(3) Public places: hospital, gymnasium, public transportation vehicle, library, shopping mall, and the like.

The first terminal may pre-save the at least two profile pictures of the first user and the scenario information corresponding to each profile picture. One profile picture may correspond to any one piece of the scenario information or a combination of at least two pieces of scenario information. The scenario information may include time information and/or address information. For example, Table 1 lists examples of conventional profile picture information, and Table 2 lists examples of profile picture information provided in this application.

TABLE 1

| Profile picture information | | |
|---|---|---|
| Communication number | Alias | Profile picture |
| 176****8596 | Aimee | Profile picture a |
| 138****9763 | Aaron | Profile picture b |
| ... | ... | ... |
| 136****6983 | Ben | Profile picture c |

As shown in Table 1, only one fixed profile picture is set for the first user on the first terminal. Therefore, whenever the first terminal displays the display screen that includes the profile picture of the first user, the first terminal displays only the fixed profile picture on the display screen. For example, it is assumed that a current time is 08:08 on Jul. 12, 2017, and the mobile phone shown in (a) in FIG. 1 is currently located in Beijing, China. In other words, the Beijing city in which the mobile phone is currently located is in midsummer. However, a profile picture of a user Aimee that is set on the mobile phone shown in (a) in FIG. 1 is a profile picture a (snowman), and therefore a "contact screen" 102 shown in (a) in FIG. 1 can display only the profile picture a. This does not match a season of the city in which the mobile phone is currently located, and user experience is comparatively poor.

TABLE 2

| | | Profile picture information | | |
|---|---|---|---|---|
| | | Scenario information | | |
| Communication number | Alias | Time information | Location information | Profile picture |
| 176****8596 | Aimee | Winter | None | Profile picture a |
| | | Summer | Swimming pool | Profile picture c |
| 138****9763 | Aaron | Other time periods beyond 08:00 to 18:00 | Home | Profile picture b |
| | | 08:00-18:00 | Office | Profile picture e |
| | | Birthday (July 12) | None | Profile picture d |
| ... | ... | ... | ... | ... |
| 136****6983 | Ben | First half of a year | Valentine's day | None | Profile picture f |
| | | | None | City | Profile picture g |
| | | | Tourist destination | Profile picture h |
| | | Second half of the year | City | Profile picture i |

As shown in Table 2, in this application, the first terminal may save at least one profile picture of the first user and scenario information corresponding to each profile picture of the first user. For example, for the owner Aimee of the mobile phone 100, the mobile phone 100 may save the profile pictures a and c. Scenario information corresponding to the profile picture a is "winter." In other words, when the mobile phone 100 displays, in winter, the display screen that includes the profile picture of Aimee, the mobile phone 100 may display the profile picture a. Scenario information corresponding to the profile picture c is "summer" and "swimming pool." In other words, when the mobile phone 100 displays, in summer, the display screen that includes the profile picture of Aimee and when Aimee is in the swimming pool, the mobile phone 100 may display the profile picture c. In other words, in this application, the first terminal may display, based on the current scenario information of the first user, the profile picture corresponding to the current scenario information, instead of displaying a fixed profile picture at any time or in any place.

Figure 5B:
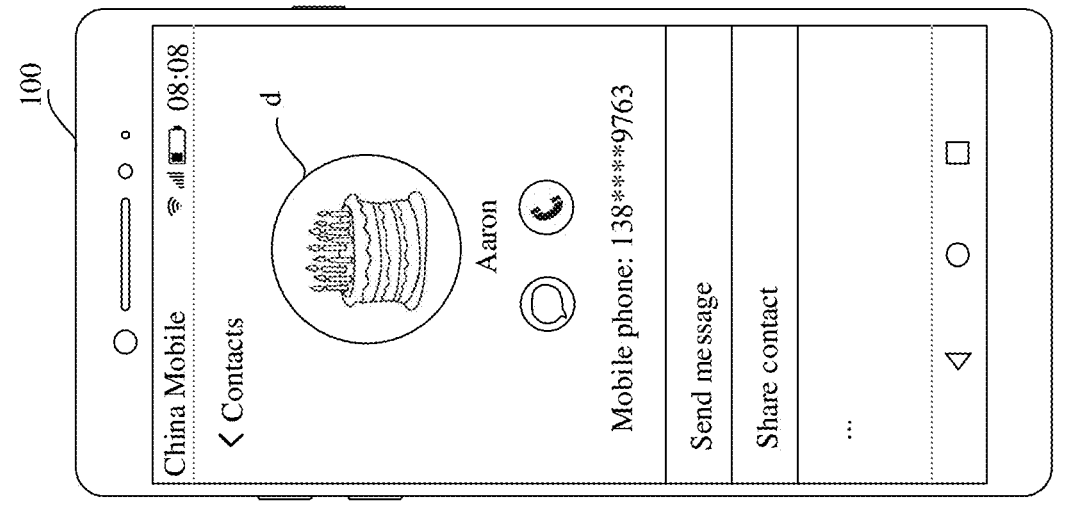
FIG. 5B is a schematic diagram 4 of an example of a display screen of a terminal according to this application.
Figure 5B:
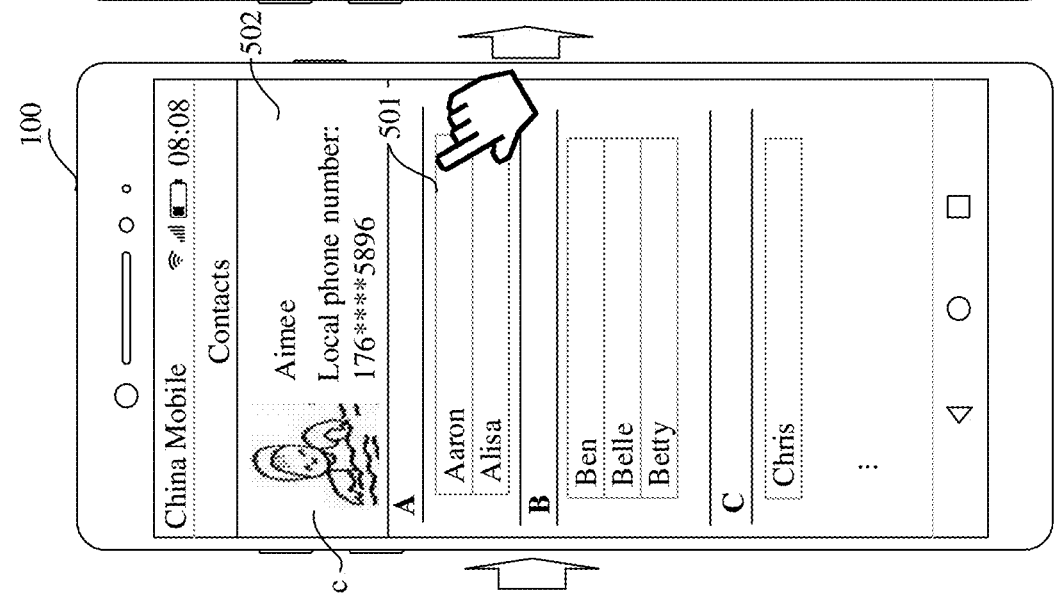
Figure 5B:
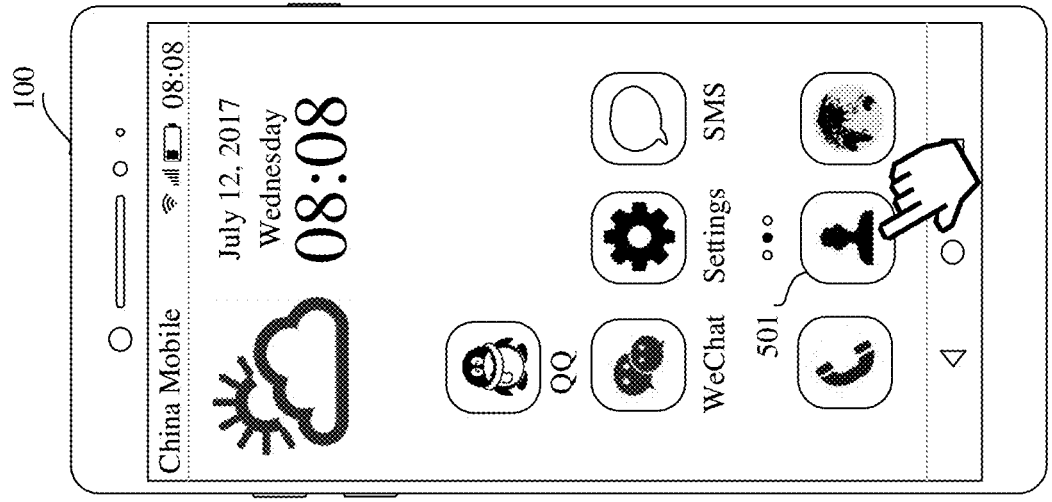

For example, in the first application scenario of this application, after the user taps an icon 501 of the "contacts" application shown in (a) in FIG. 5B, when it is assumed that time information obtained by the mobile phone 100 is July 12 (in other words, summer), and it is determined that the mobile phone 100 is currently located in a swimming pool, the mobile phone 100 may determine the profile picture c corresponding to current scenario information based on Table 2. Then, the mobile phone 100 may display a "contact screen" 502 shown in (b) in FIG. 5B. The "contact screen" 502 includes the "profile picture" c of the owner Aimee of the mobile phone 100.

In the second application scenario of this application, after the user taps the "Aaron's contact information option" 501 shown in (b) in FIG. 5B, when it is assumed that time information obtained by the mobile phone 100 is July 12, and it is learned from Table 2 that July 12 is the birthday of Aaron, the mobile phone 100 may determine that a profile picture corresponding to current scenario information (birthday on July 12) is the profile picture d. Then, the mobile phone 100 may display the "contact screen" shown in (c) in FIG. 5B. The "contact screen" includes the profile picture d of the contact Aaron of the mobile phone 100.

Figure 6:
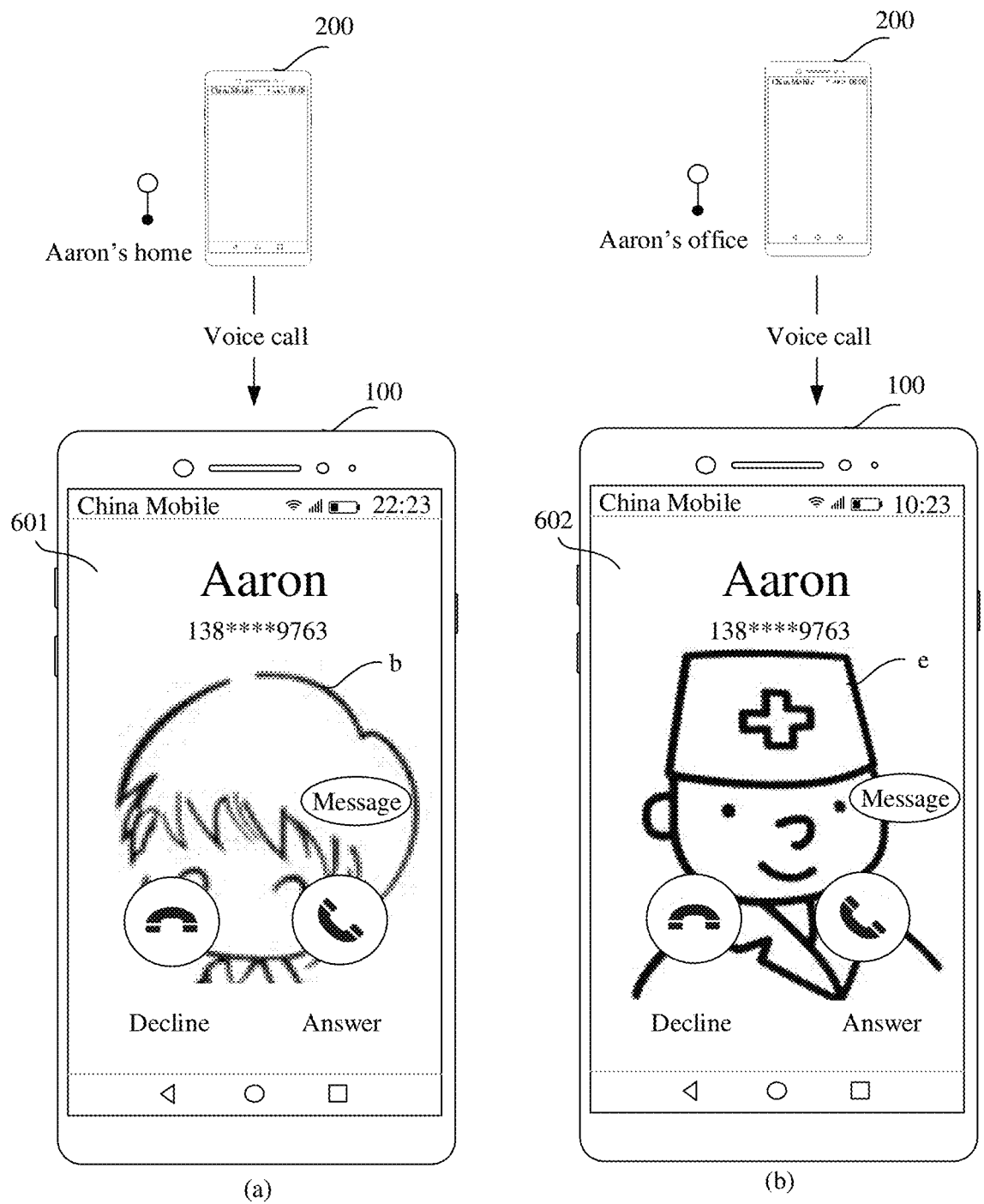
FIG. 6 is a schematic diagram 5 of an example of a display screen of a terminal according to this application.

In the third application scenario of this application, when a mobile phone 200 initiates a voice call request (a first voice request) to the mobile phone 100 at Aaron's home, the mobile phone 100 may display the "incoming call notification screen" 601 shown in (a) in FIG. 6. The first voice request is initiated by the mobile phone 200 at 22:23 at Aaron's home. It can be learned from Table 2 that scenario information (22:23 and home) corresponds to the profile picture b. Therefore, the "incoming call notification screen" 601 includes the profile picture b. When the mobile phone 200 initiates a voice call request (a second voice request) to the mobile phone 100 at Aaron's office, the mobile phone 100 may display the "incoming call notification screen" 602 shown in (b) in FIG. 6. The second voice request is initiated by the mobile phone 200 at 10:23 at Aaron's office. It can be learned from Table 2 that scenario information (10:23 and office) corresponds to the profile picture e. Therefore, the "incoming call notification screen" 602 includes the profile picture e.

In this application, the first terminal may periodically obtain address information of a contact. Alternatively, the first terminal may determine the address information of the contact based on current time information. For example, when current time is within a period from 08:00 to 18:00 on a workday, the first terminal may determine that current address information of the contact is office.

It may be understood that, when displaying any first screen shown in FIG. 1 to FIG. 3, the first terminal may display the first profile picture (the profile picture corresponding to the current scenario information of the first user) on the first screen. In this application, a specific manner of displaying, by the first terminal, the first profile picture (the profile picture corresponding to the current scenario information of the first user) on the voice call screen and the SMS message screen of the first terminal is not described in detail again.

It should be noted that, in this application, when no profile picture of a contact is set on the first terminal, the first terminal may display the first screen that includes a default profile picture. For example, the default profile picture may be a profile picture 305 shown in (a) in FIG. 3.

It may be understood that the scenario information may include more than one group of time information and address information. The time information is used as an example. For example, time information corresponding to a profile picture may include: first half of a year, summer, first ten-day period of a month, and late morning. All periods included in the time information may include or being included by other periods. To avoid that the first terminal cannot normally obtain the first profile picture or cannot display the first screen including the first profile picture due to the disordered time information, the first terminal may classify the time information. For example, the first terminal may classify the time information into specific time information, day time information, month time information, year time information, and the like.

For example, the specific time information may include a holiday, and a special date and a solar term set by the user. The day time information may include a fixed period of a day, for example, 08:00 to 18:00, the beginning of the day, the early morning, the midmorning, the late morning, the noon, the afternoon, the evening, the night, and the midnight. The month time information may be the first ten-day period of a month, the middle ten-day period of the month, the last ten-day period of the month, and the like. The year time information may include the first half of a year, the second half of the year, spring, summer, autumn, winter, and the like.

A priority of the specific time information is D1, a priority of the daily information is D2, a priority of the month time information is D3, and a priority of the year time information is D4. D1>D2>D3>D4. The first terminal may sequentially match, in descending order of the priorities of the time information, time information corresponding to the profile picture of the first user, to determine the profile picture corresponding to the time information. The address information includes at least two levels of address range information. Priorities of the at least two levels of address range information decrease in ascending order of address ranges. Specifically, S502 may include S601.

S601: The first terminal, in response to the first input, sequentially searches, in descending order of priorities of time information and address information, for the first profile picture that is in the profile picture of the first user and that corresponds to the current scenario information, and displaying the first screen that includes the first profile picture after finding the first profile picture for the first time.

Figure 7:
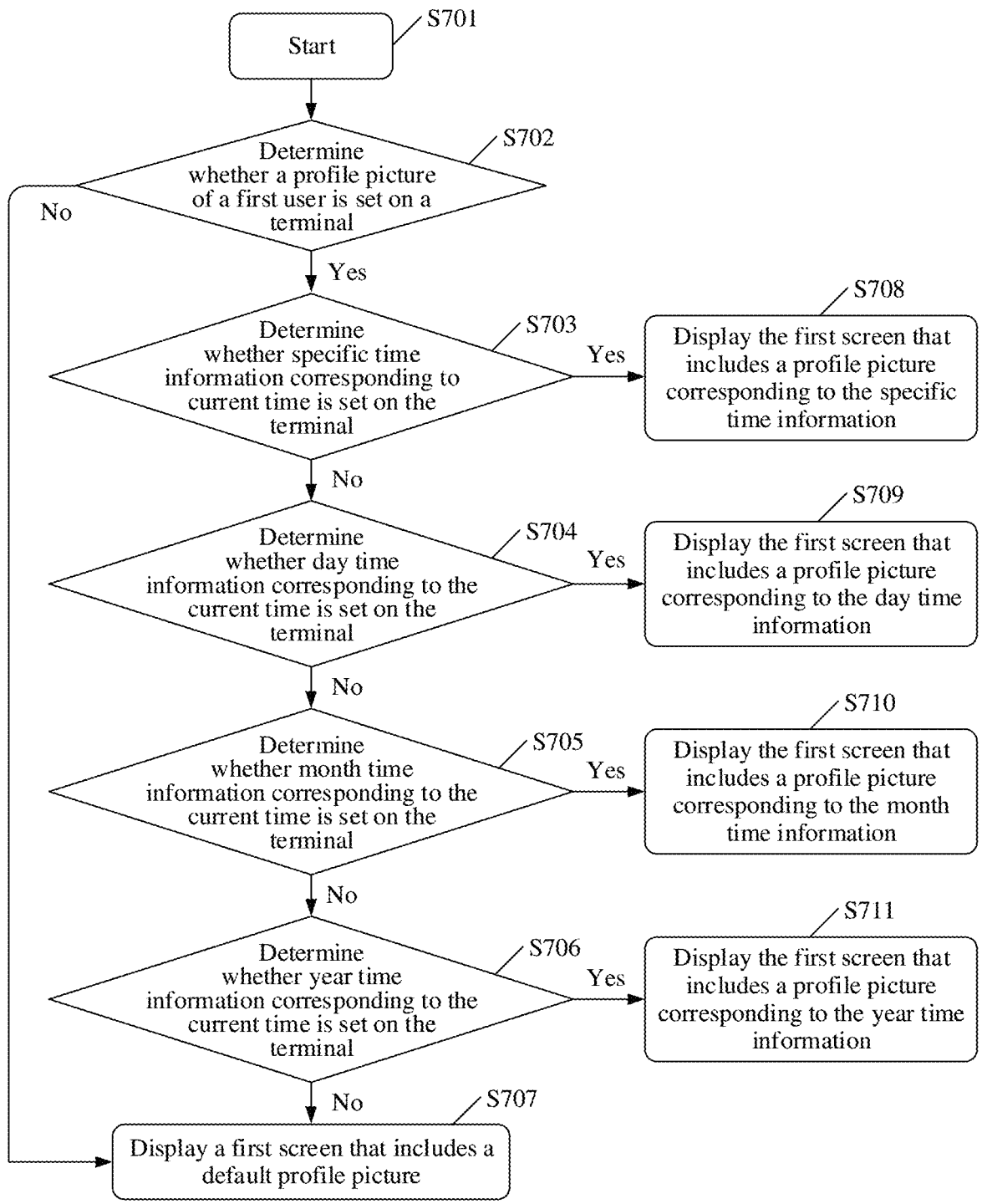
FIG. 7 is flowchart 2 of a profile picture display method according to this application.

For example, S601 in this application is described herein by using an example in which the current scenario information is the current time information. As shown in FIG. 7, a method for displaying, by the first terminal in response to the first input, the first screen that includes the first profile picture may include S701 to S711.

S701: Start.

S702: Determine whether the profile picture of the first user is set on the first terminal.

The first user may be the owner or the contact. For example, when the first terminal needs to display, in response to the first input, the display screen (the display screen shown in any one of FIG. 1 to FIG. 3) that includes the profile picture of the first user, the first terminal may determine, based on the first input, whether the profile picture of the first user is set on the first terminal.

Specifically, when the profile picture of the first user is set on the first terminal, proceed to S703. When the profile picture of the first user is not set on the first terminal, proceed to S707.

S703: Determine whether specific time information corresponding to current time is set on the first terminal.

Specifically, when the specific time information corresponding to the current time is not set on the first terminal, proceed to S704. When the specific time information corresponding to the current time is set on the first terminal, proceed to S708.

S704: Determine whether day time information corresponding to the current time is set on the first terminal.

Specifically, when the day time information corresponding to the current time is not set on the first terminal, proceed to S705. When the day time information corresponding to the current time is set on the first terminal, proceed to S709.

S705: Determine whether month time information corresponding to the current time is set on the first terminal.

Specifically, when the month time information corresponding to the current time is not set on the first terminal, proceed to S706. When the month time information corresponding to the current time is set on the first terminal, proceed to Sm.

S706: Determine whether year time information corresponding to the current time is set on the first terminal.

Specifically, when the year time information corresponding to the current time is not set on the first terminal, proceed to S707. When the year time information corresponding to the current time is set on the first terminal, proceed to S711.

S707: Display the first screen that includes a default profile picture.

S708: Display the first screen that includes a profile picture corresponding to the specific time information.

S709: Display the first screen that includes a profile picture corresponding to the day time information.

S710: Display the first screen that includes a profile picture corresponding to the month time information.

S711: Display the first screen that includes a profile picture corresponding to the year time information.

Correspondingly, the scenario information may include more than one group of address information. For example, address information corresponding to a profile picture may include Asia, China, Shanxi province, Xi'an city, Yanta district, and the like. These pieces of address information included in the address information include or being included by other address information. To avoid that the first terminal cannot normally obtain the first profile picture or cannot display the first screen including the first profile picture due to the disordered address information, the first terminal may classify the address information. Specifically, the first terminal may classify the address information into at least two levels of address range information. The at least two levels of address range information decreases in ascending order of address ranges. For example, a priority of district-level address information (for example, Yanta district) is higher than a priority of city-level address information (for example, Xi'an), the priority of the city-level address information (for example, Xi'an) is higher than a priority of province-level address information (for example, Shanxi province), and the priority of the province-level address information (for example, Shanxi province) is higher than a priority of country-level address information (for example, China).

It may be understood that, the time information may be classified into the time information with a plurality of priorities, the address information includes the at least two levels of address range information, and the time information and the address information may also have priorities. This can avoid a case in which the first terminal cannot normally obtain the first profile picture when current time information and current address information of the terminal located at a time point and in a location correspond to different profile pictures. Specifically, S601 may include S601a to S601c.

S601a: The first terminal determines, in response to the first input, whether the priority of the time information is higher than the priority of the address information.

Specifically, when the priority of the time information is higher than the priority of the address information, proceed to S601b. When the priority of the time information is not higher than the priority of the address information, proceed to S601c.

S601b: The first terminal sequentially searches, in descending order of the priorities of the time information, for the first profile picture that is in the profile picture of the first user and that corresponds to current time information, and displays the first screen that includes the first profile picture after finding the first profile picture for the first time.

For detailed descriptions of S601b in this application, refer to related method steps in S701 to S711 in this application. Details are not described herein again.

S601c: The first terminal sequentially searches, in descending order of the priorities of the address information, for the first profile picture that is in the profile picture of the first user and that corresponds to current address information, and displays the first screen that includes the first profile picture after finding the first profile picture for the first time.

A method for "sequentially searching, by the first terminal, in descending order of the priorities of the address information, for the first profile picture that is in the profile picture of the first user and that corresponds to current address information, and displaying the first screen that includes the first profile picture after finding the first profile picture for the first time" in S601c of this application, refer to detailed descriptions of "sequentially searching, by the first terminal in descending order of the priorities of the time information, for the first profile picture that is in the profile picture of the first user and that corresponds to current time information, and displaying the first screen that includes the first profile picture after finding the first profile picture for the first time" in this application. Details are not described herein again.

According to the profile picture display method provided in this application, in response to the first input, the first terminal may sequentially match, in descending order of the priorities of the time information and the address informa-
tion, the first profile picture corresponding to the current scenario information, and display the first screen that includes the first profile picture. A higher priority of the time information indicates a smaller time range of the time information. Therefore, the first terminal may first search, in descending order of the priorities of the time information, for the first profile picture corresponding to time information with a high priority, in other words, the first profile picture corresponding to time information with a relatively small time range. In this way, the first terminal may quickly find the first profile picture corresponding to the small time range without reducing a large time range level by level.

Further, in an implementation of this application, the first terminal may pre-save the at least two profile pictures of the first user and the scenario information corresponding to each profile picture.

Figure 8:
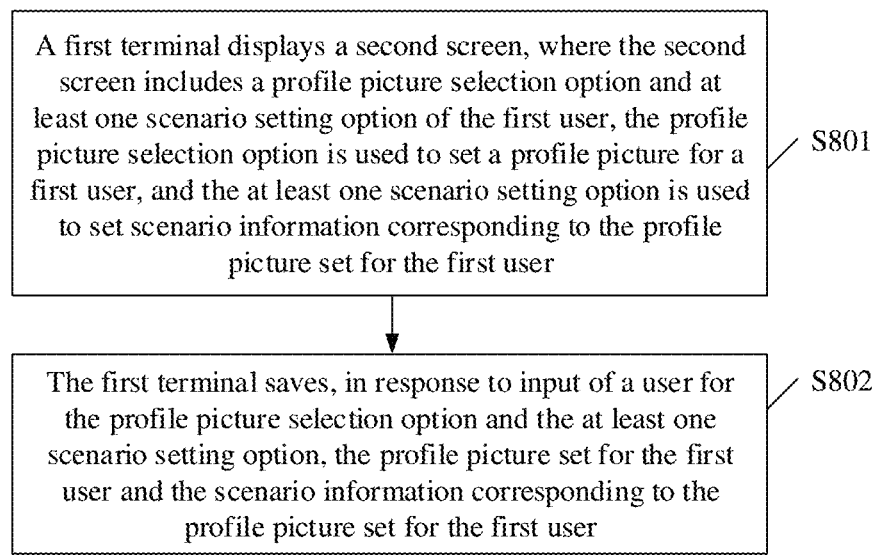
FIG. 8 is flowchart 3 of a profile picture display method according to this application.
Figure 9:
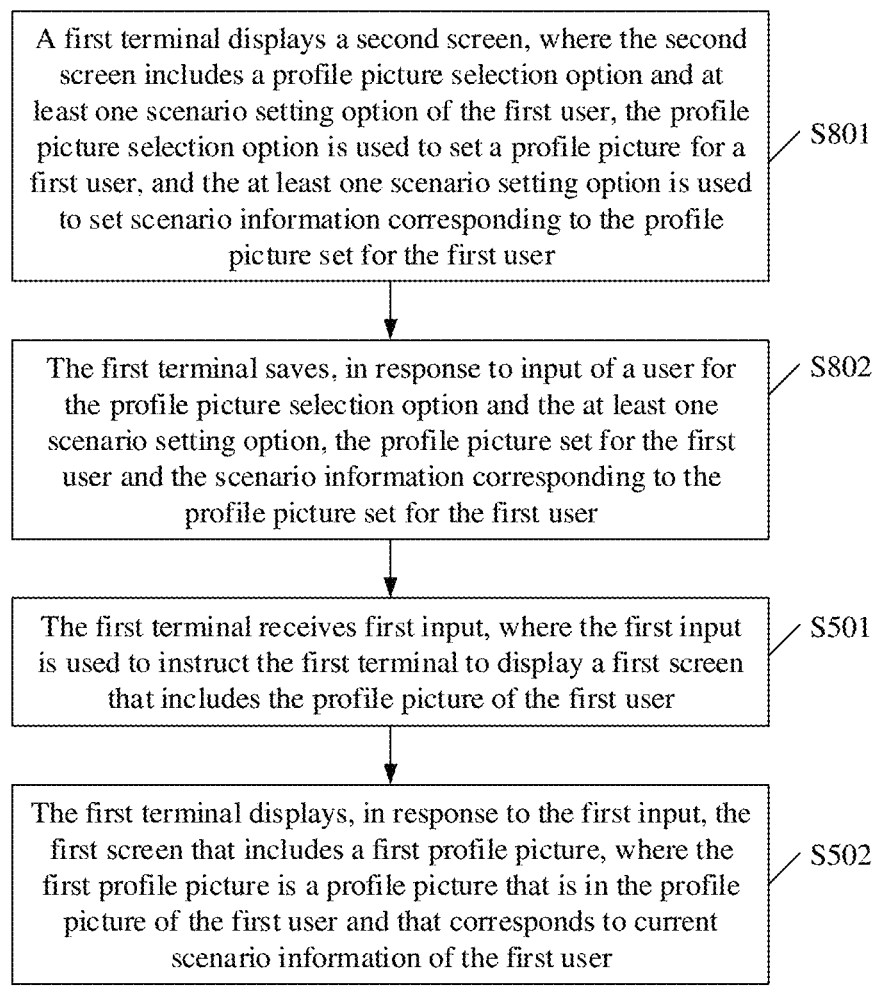
FIG. 9 is flowchart 4 of a profile picture display method according to this application.

In another implementation of this application, the at least two profile pictures of the first user and the scenario information corresponding to each profile picture may be information that is set by the user and that is received by the first terminal on a second screen (namely, a profile picture setting screen). Specifically, this application further provides a profile picture setting method. As shown in FIG. 8, the profile picture setting method includes S801 and S802. Alternatively, as shown in FIG. 9, before S501 shown in FIG. 5, the method in this application may further include S801 and S802.

S801: A first terminal displays a second screen, where the second screen includes a profile picture selection option and at least one scenario setting option of a first user, the profile picture selection option is used to set a profile picture for the first user, and the at least one scenario setting option is used to set scenario information corresponding to the profile picture set for the first user.

Figure 10A:
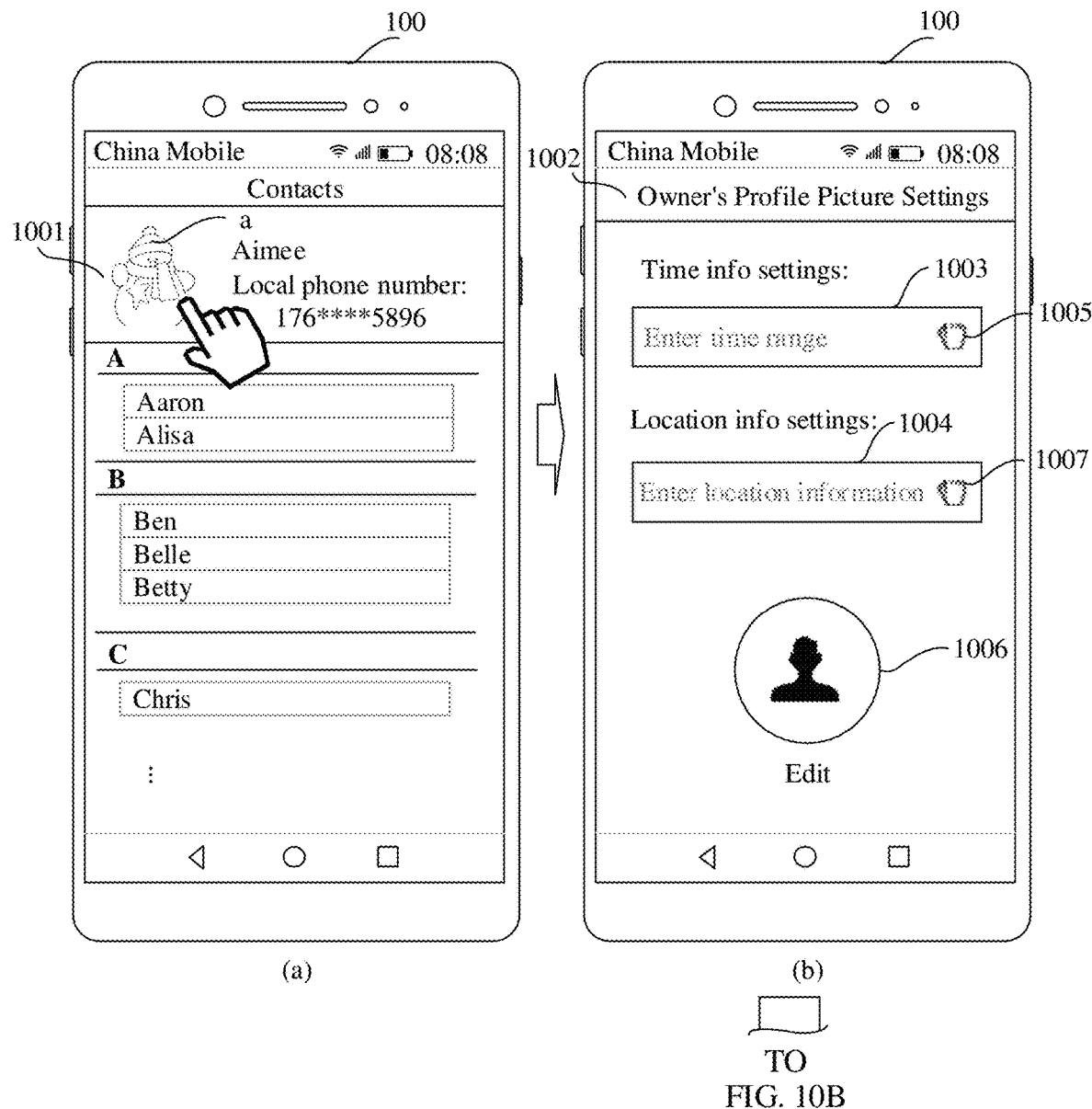
FIG. 10A and FIG. 10B are a schematic diagram 6 of an example of a display screen of a terminal according to this application.
Figure 10B:
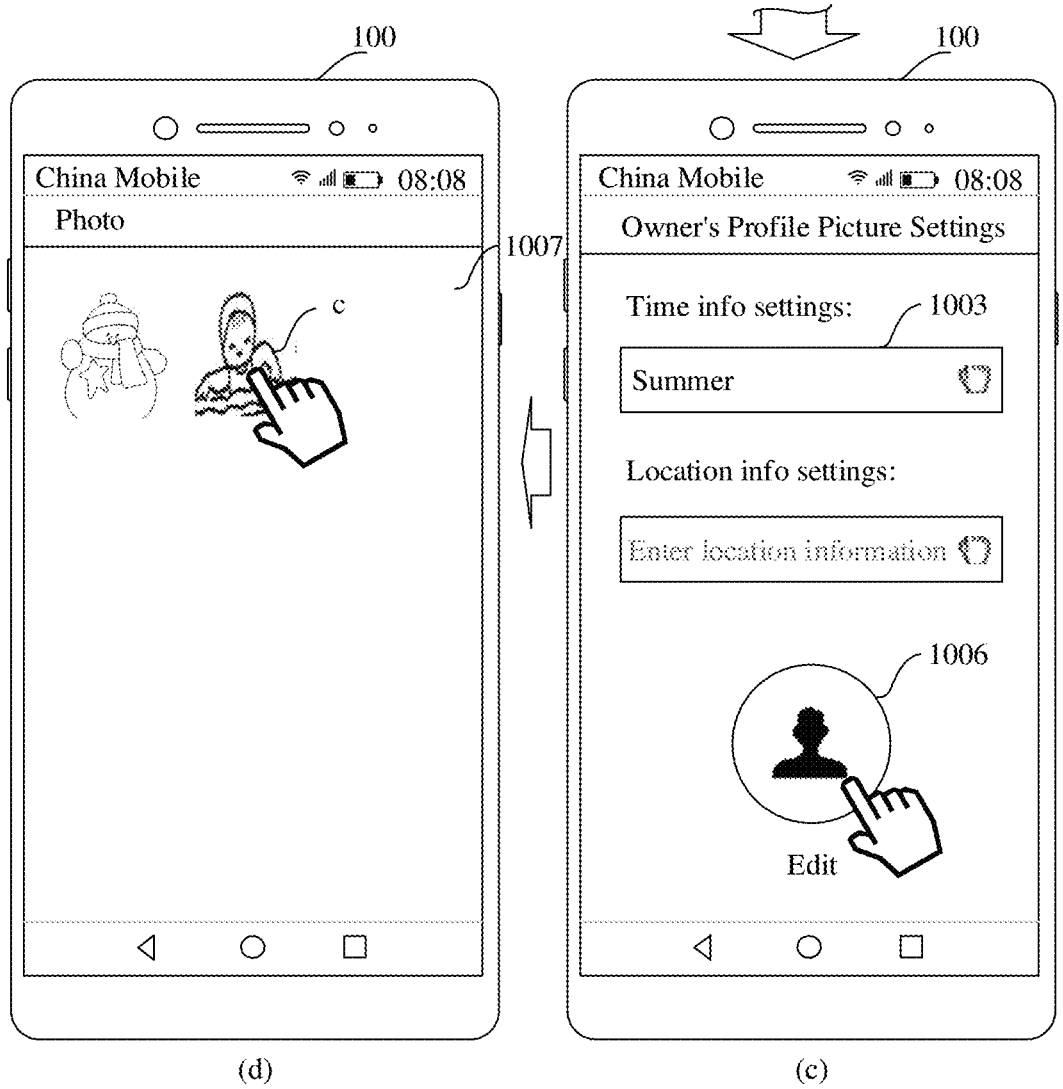

For example, it is assumed that the terminal is the mobile phone 100 shown in FIG. 10A and FIG. 10B. After the user taps a profile picture a on a "contact screen" 1001 shown in (a) in FIG. 10A, the mobile phone 100 may display a "profile picture setting screen" 1002 (namely, the second screen) shown in (b) in FIG. 10A. The "profile picture setting screen" 1002 includes a time setting option 1003 (namely, a scenario setting option), a location setting option 1004 (namely, a scenario setting option), and a profile picture selection option 1006.

The time setting option 1003 is used to set time information applicable to a profile picture subsequently set by the profile picture option 1006. For example, as shown in (c) in FIG. 10B, after the user enters "summer" in the time setting option 1003, it indicates that a profile picture c that is subsequently set by the user for Aimee is applicable to summer. In other words, when displaying the profile picture of Aimee in summer, the mobile phone 100 may display the profile picture c. The location setting option 1004 is used to set information about a location to which the profile picture c subsequently set by the profile picture option 1006 is applicable. The profile picture selection option 1006 is used to set the profile picture for the first user (for example, an owner Aimee). For example, after the user taps the profile picture option 1006 shown in (c) in FIG. 10B, the mobile phone 100 may display a photo shown in (d) in FIG. 10B.

Figure 11:
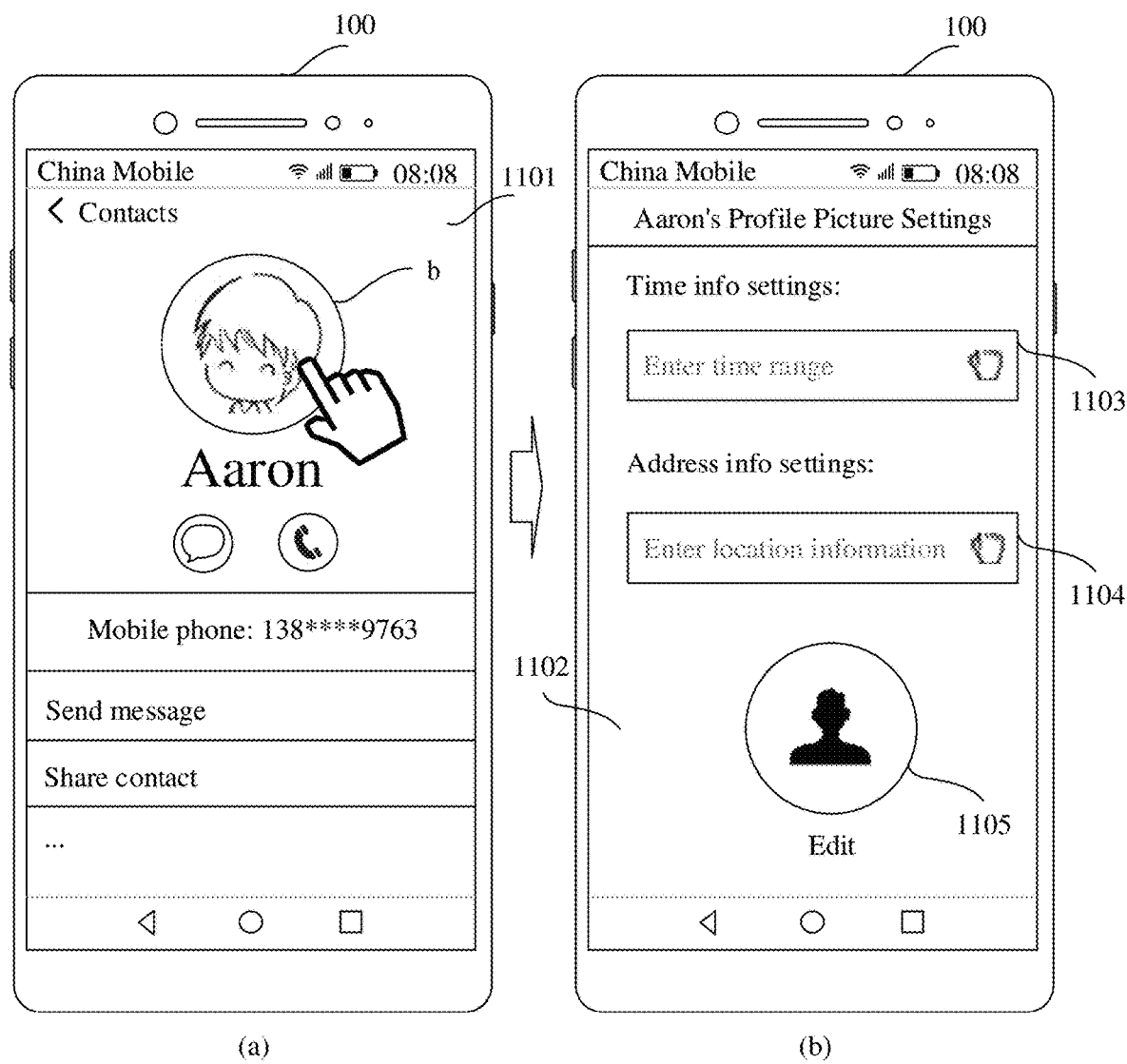
FIG. 11 is a schematic diagram 7 of an example of a display screen of a terminal according to this application.

For example, it is assumed that the terminal is the mobile phone 100 shown in FIG. 11. After the user taps a profile picture b on a "contact screen" 1101 shown in (a) in FIG. 11, the mobile phone 100 may display a "profile picture setting screen" 1102 (namely, the second screen) shown in (b) in FIG. 11. The "profile picture setting screen" 1102 includes a time setting option 1103 (namely, a scenario setting option), a location setting option 1104 (namely, a scenario setting option), and a profile picture selection option 1105.

For detailed descriptions of the time setting option 1103, the location setting option 1104, and the profile picture selection option 1105 in this application, refer to detailed descriptions of the time setting option 1003, the location setting option 1004, and the profile picture selection option 1006. Details are not described herein.

Figure 12:
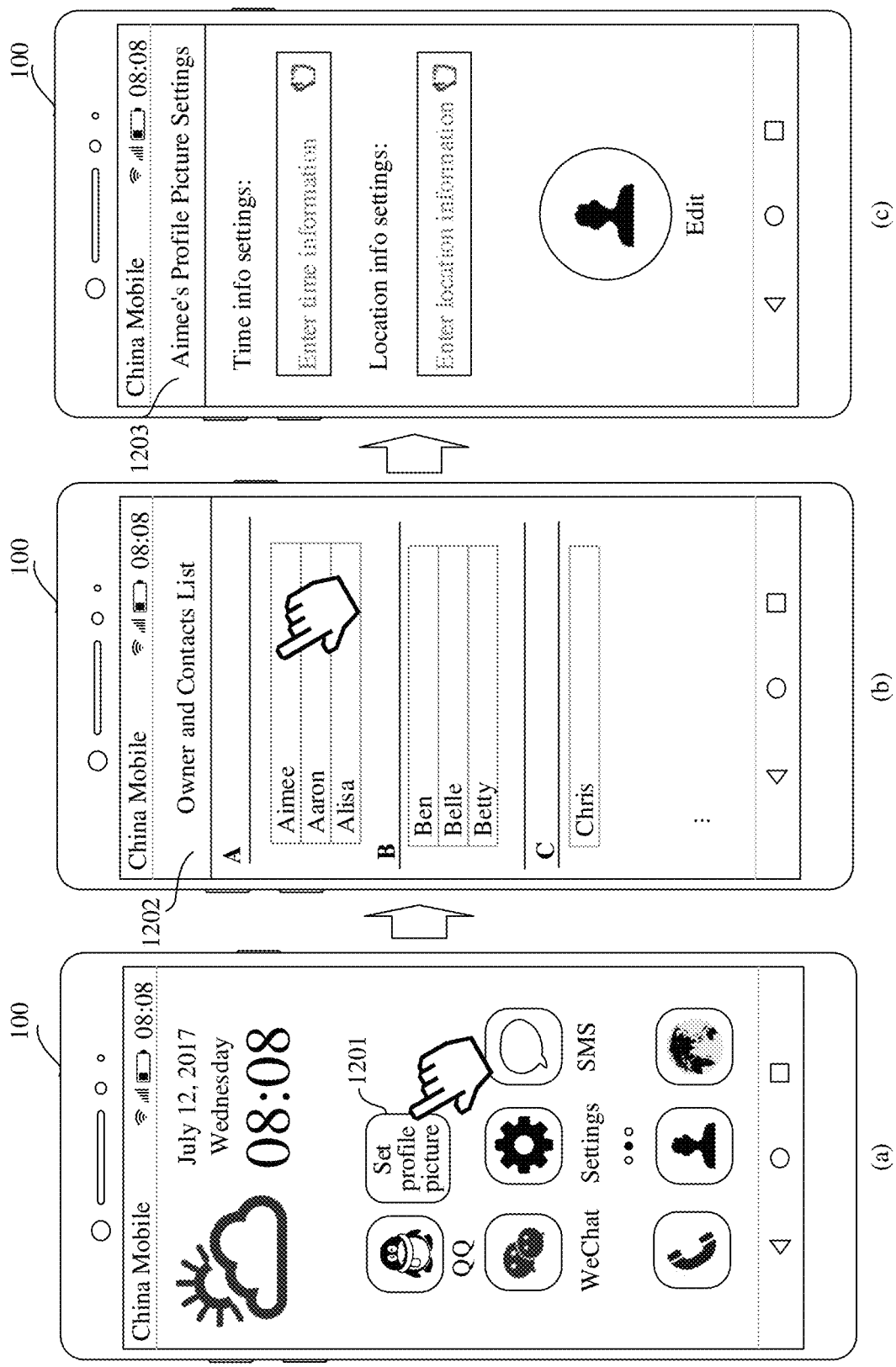
FIG. 12 is a schematic diagram 8 of an example of a display screen of a terminal according to this application.

Optionally, an application program used to set a profile picture for an owner or a contact may be installed on the first terminal, and the first terminal may display the second screen in response to a tap operation performed by the user on an icon of the application program. For example, a "profile picture setting" application program 1201 shown in (a) in FIG. 12 may be installed on the mobile phone 100. After the user taps the "profile picture setting" application program 1201 shown in (a) in FIG. 12, the mobile phone 100 may display an "owner and contact list screen" 1202 shown in (b) in FIG. 1. The "owner and contact list screen" 1202 includes the information option of the owner of the mobile phone 100 (for example, Aimee's information option) and an information option of at least one contact (for example, Aaron's information option and Alisa's information option). An example in which the user sets the profile picture for the owner Aimee is used. After the user taps the "Aimee's information option" shown in (b) in FIG. 12, the mobile phone 100 may display a "profile picture setting screen" 1203 shown in (c) in FIG. 12. For detailed descriptions of the "profile picture setting screen" 1203, refer to detailed descriptions of the "profile picture setting screen" 1002 shown in (b) in FIG. 10A in this application. Details are not described herein again.

The "time setting option" is used to enter display time of a to-be-set profile picture. The "location setting option" is used to enter a location in which the terminal displays the to-be-set profile picture. Alternatively, the user may select, from a time selection option and a location selection option provided by the "time setting option" and the "location setting option", time information and location information corresponding to the to-be-set profile picture. For example, as shown in (b) in FIG. 10A, the "time setting option" 1003 may further include a "time obtaining button" 1005, and the "location setting option" 1004 may further include a "location obtaining button" 1007.

Figure 13:
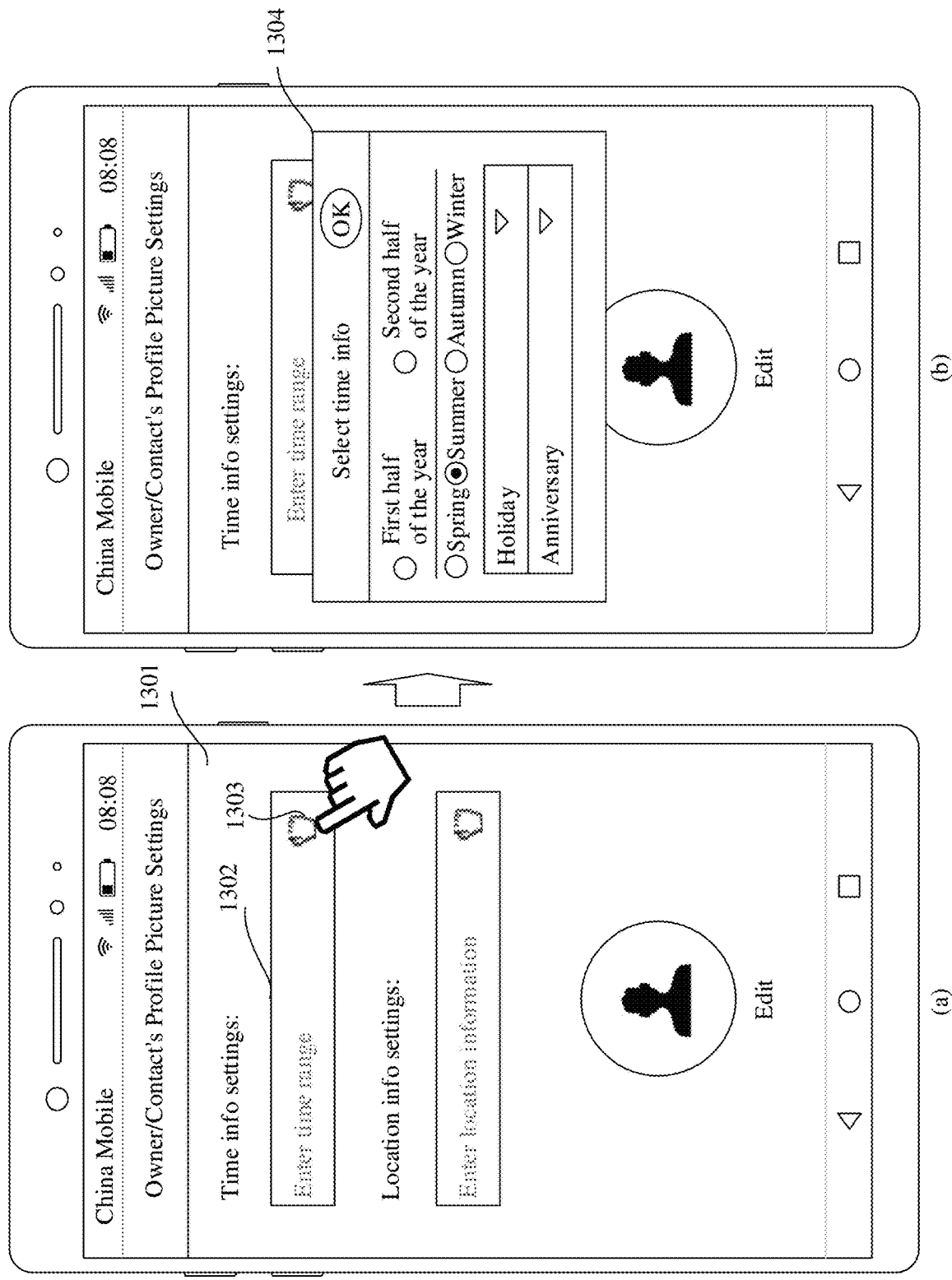
FIG. 13 is a schematic diagram 9 of an example of a display screen of a terminal according to this application.
Figure 14:
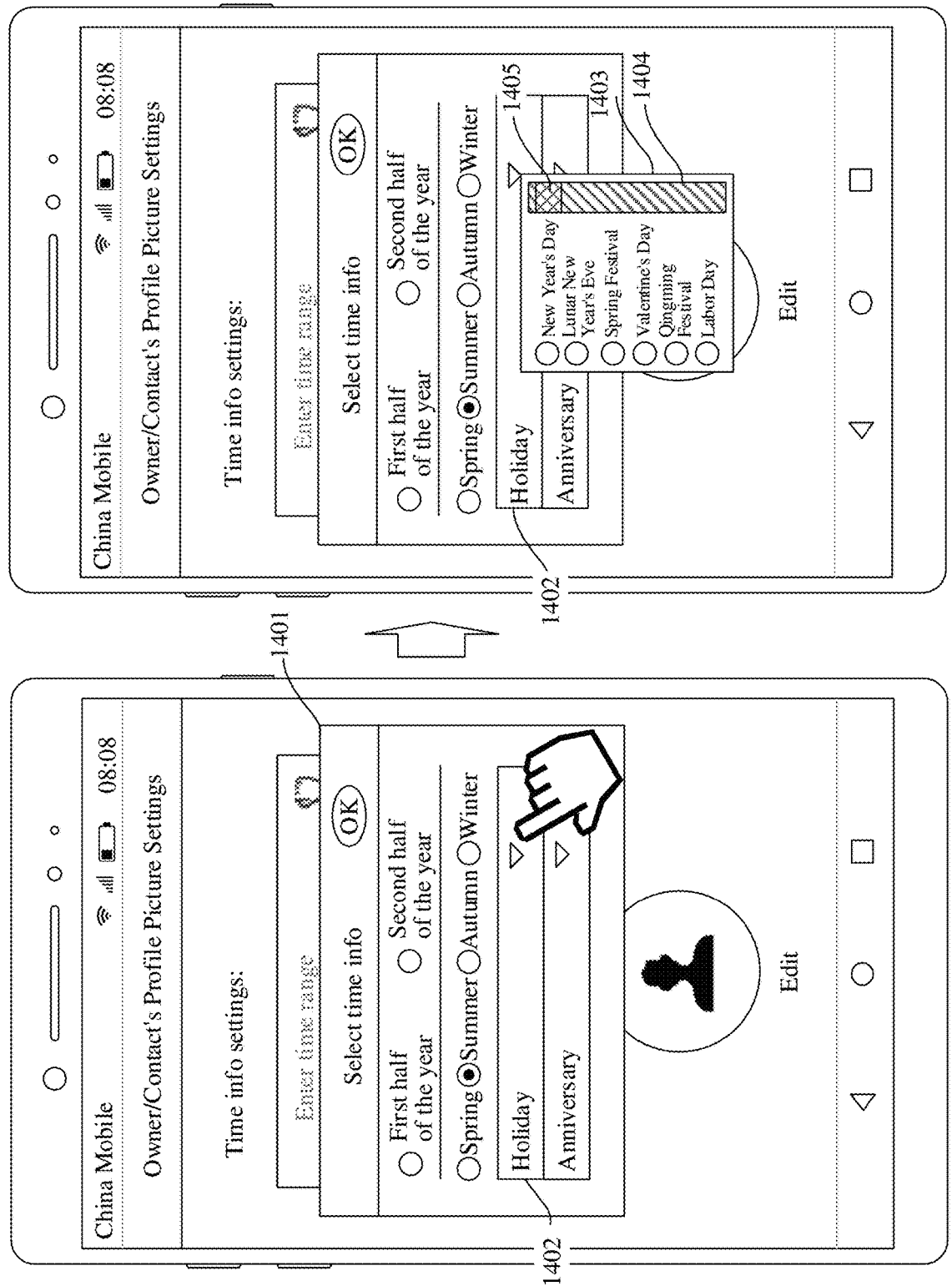
FIG. 14 is a schematic diagram 10 of an example of a display screen of a terminal according to this application.

After the user taps a "time obtaining button" 1303 shown in (a) in FIG. 13 (same as the "time obtaining button" 1005 shown in (b) in FIG. 10A), the mobile phone 100 may display a "time selection window" 1304 shown in (b) in FIG. 13. The "time selection window" 1304 may include at least one time category, for example, "the first half of a year and the second half of the year", "spring, summer, autumn, and winter", "holiday selection option", and "anniversary setting option." After the user taps a drop-down list box (a triangular button) of the "holiday selection option", the mobile phone 100 may display options of all holidays (for example, lunar new year's eve, spring festival, and labor day) that can be set by the user. For example, after the user taps a "holiday setting option" 1402 in a "time selection window" 1401 shown in (a) in FIG. 14, the mobile phone 100 may display a holiday setting screen 1403. The holiday setting screen 1403 may include holiday options such as "new year's day", "lunar new year's eve" and "spring festival." Due to a limitation on the display panel of the mobile phone 100, the mobile phone 100 cannot display all holiday options. Therefore, the holiday setting screen 1403 may further include a drag bar 1404 and a drag button 1405. When the user drags the drag button 1405 downward on the drag bar 1404, the holiday setting screen 1403 of the mobile phone 100 may display more holiday options, such as "dragon boat festival", "children's day", and "national day."

Similarly, when the user taps a drop-down list box (a triangular button) of the "anniversary setting option", the mobile phone 100 may display an anniversary setting screen that can be set by the user. For details about the anniversary setting screen, refer to an anniversary setting screen in a calendar of the mobile phone. Details are not described herein.

S802: The first terminal saves, in response to input of a user for the profile picture selection option and the at least one scenario setting option, the profile picture set for the first user and the scenario information corresponding to the profile picture set for the first user.

The first terminal may save, in response to the input of the user for the profile picture selection option and the at least one scenario setting option, the profile picture set for the first user and the scenario information corresponding to the profile picture set for the first user that are listed in Table 2.

According to the profile picture display method provided in this application, the first terminal may display the profile picture setting screen (namely, the second screen) of the first user, and the user sets, on the profile picture setting screen, profile pictures to be displayed for the first user based on different scenario information (for example, the time information and the location information).

Figure 15:
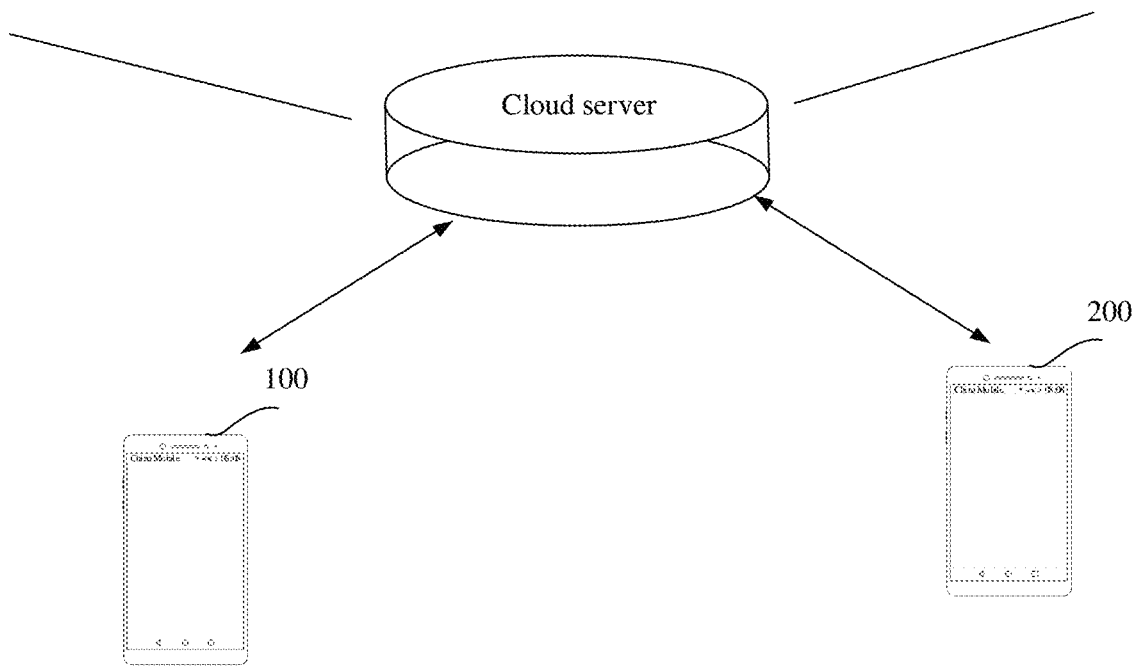
FIG. 15 is a schematic diagram of a network architecture to which a profile picture display method is applied according to this application.
Figure 16:
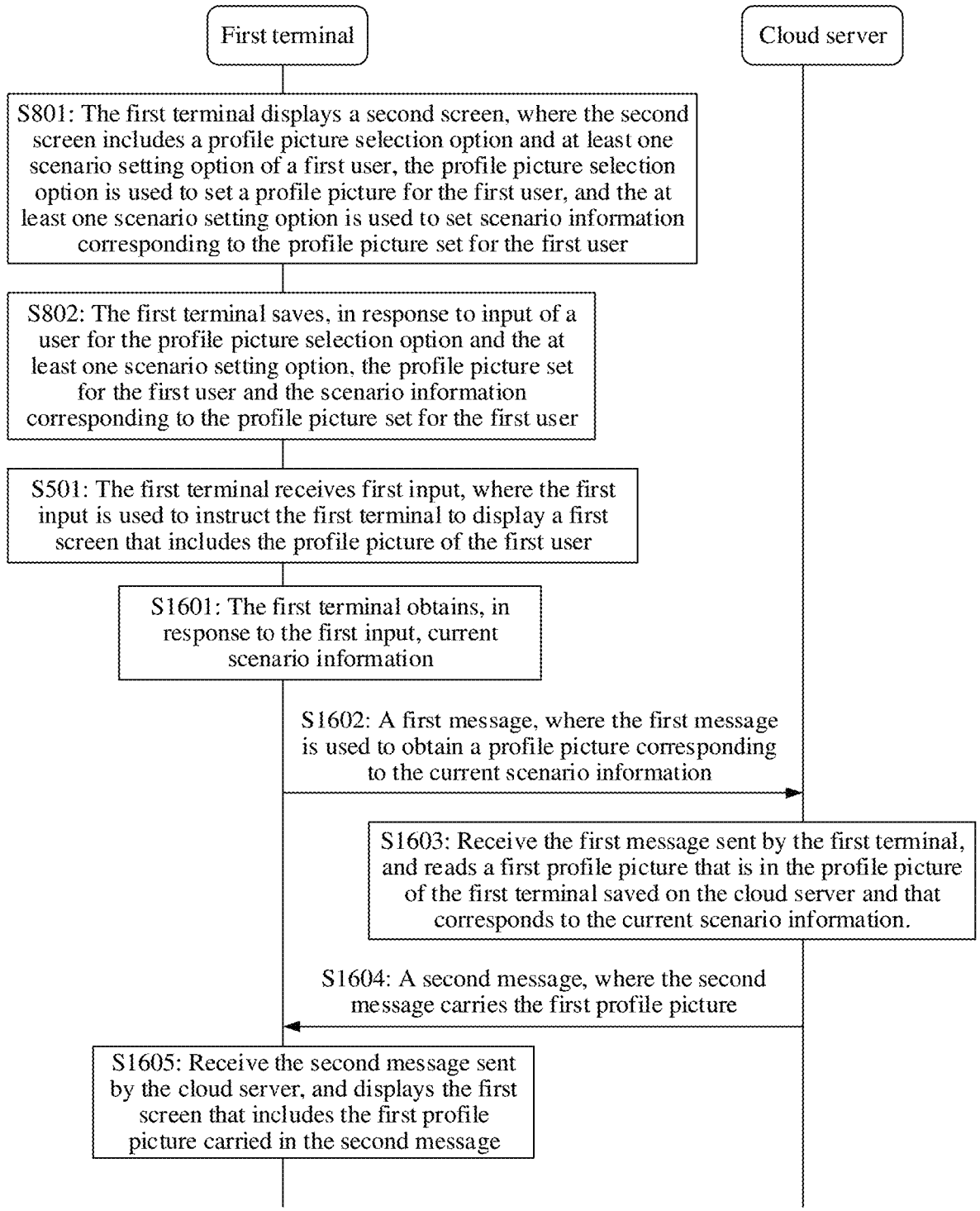
FIG. 16 is flowchart 5 of a profile picture display method according to this application.

Optionally, in an implementation of this application, to avoid that a plurality of profile pictures are separately set for the owner and a plurality of contacts on the first terminal, and the profile pictures that need to be saved occupy storage space of the first terminal, as shown in FIG. 15, the first terminal may upload "the profile picture set for the first user and the scenario information corresponding to the profile picture set for the first user" to a cloud server, and the cloud server saves "the profile picture set for the first user and the scenario information corresponding to the profile picture set for the first user", in other words, the profile picture and the scenario information listed in Table 2. In this way, after receiving the first input, the first terminal may obtain the corresponding profile picture from the cloud server. Specifically, S502 may be replaced with S1601 to S1605. For example, as shown in FIG. 16, S502 shown in FIG. 9 may be replaced with S1601 to S1605.

S1601: The first terminal obtains, in response to the first input, current scenario information.

The first terminal may obtain time information when the first terminal receives the first input (for example, a time point when the first terminal receives the first input is 12:08:08 on Jul. 12, 2017), and the first terminal receives location information of the first input, in other words, where the first terminal receives the first input. For example, the first terminal may obtain, by using a global positioning system (Global Positioning System, GPS) technology, the location information of the first input received by the first terminal.

S1602: The first terminal sends a first message to a cloud server, where the first message is used to obtain a profile picture corresponding to the current scenario information.

For example, the cloud server in this application may be a storage device that has a data storage capability and a wireless data communication capability.

S1603: The cloud server receives the first message sent by the first terminal, and reads a first profile picture that is in the profile picture of the first terminal saved on the cloud server and that corresponds to the current scenario information.

A manner of saving the scenario information and the profile picture corresponding to the scenario information by the cloud server is similar to a manner of saving the scenario information and the profile picture corresponding to the scenario information by the first terminal. Details are not described herein.

S1604: The cloud server sends a second message to the first terminal, where the second message carries the first profile picture.

S1605: The first terminal receives the second message sent by the cloud server, and displays the first screen that includes the first profile picture in the second message.

According to the profile picture display method provided in this application, the cloud server may save "the profile picture set for the first user and the scenario information corresponding to the profile picture set for the first user." This can avoid that a plurality of profile pictures are separately set for the owner and a plurality of contacts on the first terminal, and the profile pictures that need to be saved occupy storage space of the first terminal.

In an application scenario of this application, the first screen is a voice call screen used by the first terminal to perform voice communication with at least one second terminal, and the first profile picture may be a profile picture of an owner of the second terminal. In other words, the first user may include the owner of the second terminal that performs voice communication with the first terminal.

In an implementation of this application scenario, the first screen is a voice call screen used by the first terminal to perform voice communication with a second terminal, and the first profile picture included by the first screen is a profile picture of an owner of the second terminal.

In another implementation of this application scenario, the first screen is a voice call screen used by the first terminal to perform voice communication with a plurality of second terminals (in other words, at least two second terminals). The first profile picture included by the first screen includes profile pictures of owners of all second terminals in the plurality of second terminals. Alternatively, the first profile picture included by the first screen is a profile picture of a preset owner in the owners of the plurality of second terminals. For example, the preset owner may be a supervisor or a relative of the owner of the first terminal.

In this application scenario, in a process in which the first terminal displays the first screen (namely, the voice call screen used by the first terminal to perform voice communication with the second terminal) in S502, the first terminal may further share the profile picture of the owner of the first terminal with the second terminal.

In a possible implementation, in a process in which the first terminal performs voice communication with the at least one second terminal, a profile picture sent by the first terminal to the second terminal is a profile picture that is in the profile picture of the owner of the first terminal and that corresponds to current scenario information of the owner of the first terminal. Specifically, after S502, the method in this application may further include S1701.

S1701: The first terminal sends, to a second terminal in response to third input of a user on the first screen, a profile picture that is in a profile picture of an owner of the first terminal and that corresponds to current scenario information of the owner of the first terminal.

The first terminal may obtain, in response to the third input of the user on the first screen, the profile picture that is in the profile picture of the owner of the first terminal and that corresponds to the current scenario information of the owner of the first terminal, and send the obtained profile picture to the second terminal.

It may be understood that, if the first terminal is performing voice communication with a plurality of second terminals, "profile pictures that are in the profile picture of the owner of the first terminal, that correspond to the current scenario information of the owner of the first terminal", and that are sent by the first terminal to the plurality of second terminals are a same profile picture. In other words, the first terminal may push the same profile picture to the plurality of second terminals.

In another possible implementation, in the process in which the first terminal performs voice communication with the at least one second terminal, a profile picture sent by the first terminal to the second terminal is a profile picture that is in the profile picture of the owner of the first terminal and that corresponds to current scenario information of the owner of the second terminal. Specifically, after S502, the method in this application may further include S1702.

S1702: The first terminal sends, to a second terminal in response to third input of a user on the first screen, a profile picture that is in a profile picture of an owner of the first terminal and that corresponds to current scenario information of an owner of the second terminal.

The first terminal may obtain, in response to the third input of the user on the first screen, the profile picture that is in the profile picture of the owner of the first terminal and that corresponds to the current scenario information of the owner of the second terminal, and send the obtained profile picture to the second terminal.

It may be understood that, if the first terminal is performing voice communication with a plurality of second terminals, "profile pictures that are in the profile picture of the owner of the first terminal, that correspond to the current scenario information of the owner of the second terminal", and that are sent by the first terminal to the plurality of second terminals are different profile pictures because current scenario information of each of the plurality of second terminals is different. In other words, the first terminal may push different profile pictures to the plurality of second terminals.

It should be noted that, for a method for "obtaining, by the first terminal, the profile picture that is in the profile picture of the owner of the first terminal and that corresponds to the current scenario information" in S1701 and S1702, refer to detailed descriptions of "obtaining a profile picture corresponding to the current scenario information" in the foregoing embodiment of this application. Details are not described herein again. For detailed descriptions of "third input of a user on the first screen" in S1701 and S1702, refer to detailed descriptions of S1801 in this application. Details are not described herein again.

Figure 17:
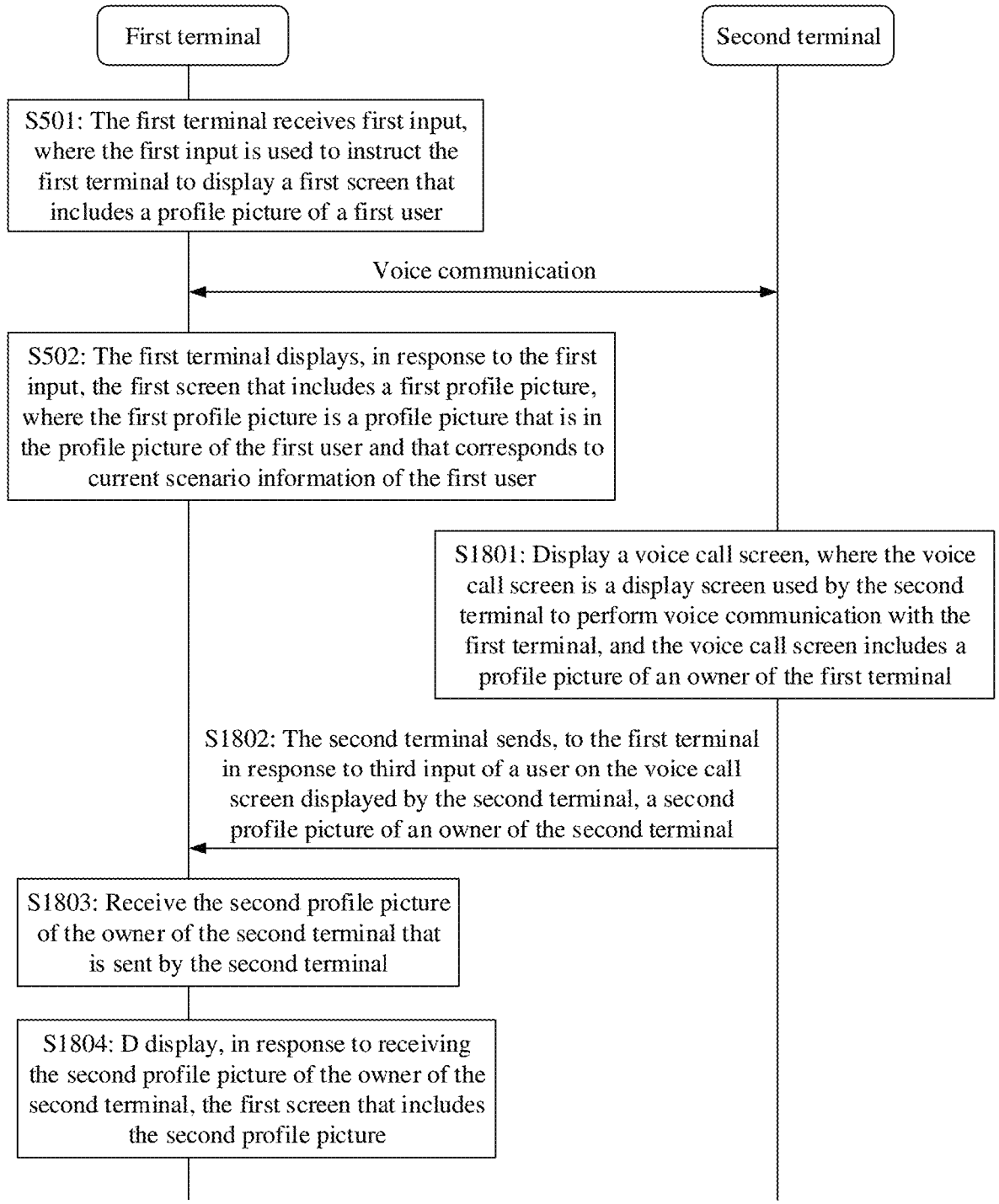
FIG. 17 is flowchart 6 of a profile picture display method according to this application.

Further, in the process in which the first terminal displays the first screen (namely, the voice call screen used by the first terminal to perform voice communication with the second terminal) in S502, the first terminal may further receive a profile picture shared by the second terminal. In the process in which the second terminal performs voice communication with the first terminal, the second terminal may also display a corresponding voice call screen. In other words, the method in this application may further include S1801. After S502 and S1801, the second terminal may send, to the first terminal in response to the input of the user, a second profile picture of the owner of the second terminal. Specifically, as shown in FIG. 17, the method in this application may further include S1801 and S1804.

S1801: A second terminal displays a voice call screen, where the voice call screen is a display screen used by the second terminal to perform voice communication with the first terminal, and the voice call screen includes a profile picture of an owner of the first terminal.

The owner of the first terminal is a contact on the second terminal. For example, it is assumed that the mobile phone 100 (namely, the first terminal, and the owner is Aimee) is performing first voice communication with the mobile phone 200 (namely, the second terminal, and the owner is Aaron). As shown in (a) in FIG. 18, the mobile phone 200 may display a "voice call screen" 1801. The "voice call screen" 1801 includes the profile picture c of the owner Aimee of the first terminal.

The owner of the second terminal is a contact on the first terminal. As shown in (a) in FIG. 19, the mobile phone 100 (namely, the first terminal) may display a "first screen" 1901. The "first screen" 1901 includes a first profile picture of the owner Aaron of the second terminal, for example, the profile picture b.

S1802: The second terminal sends, to the first terminal in response to third input of a user on the voice call screen displayed by the second terminal, a second profile picture of an owner of the second terminal.

Refer to S1701. The second profile picture sent by the second terminal to the first terminal may be the profile picture that is in the profile picture of the owner of the second terminal and that corresponds to the current scenario information of the owner of the second terminal. Refer to S1702. The second profile picture sent by the second terminal to the first terminal may alternatively be the profile picture that is in the profile picture of the owner of the second terminal and that corresponds to the current scenario information of the owner of the first terminal.

The second terminal may obtain, in response to the third input, the second profile picture from the profile picture that is of the owner of the second terminal and that is saved on the second terminal or a cloud server, and send the second profile picture to the first terminal.

For example, the third input may be a predefined gesture entered by the user on the voice call screen, or an instruction triggered by the predefined gesture entered by the user on the voice call screen. Alternatively, the voice call screen may include a "profile picture sharing option", and the third input may be a tap operation performed by the user on the "profile picture sharing option" or an instruction triggered by the tap operation performed by the user on the "profile picture sharing option." For example, the third input may be an instruction triggered by tapping, by the user, a "profile picture sharing option" 1802 shown in (a) in FIG. 18. The mobile phone 200 (namely, the second terminal) may send, to the mobile phone 100 (namely, the first terminal) in response to the instruction, the profile picture that is in the profile picture of the owner of the mobile phone 200 and that corresponds to the current scenario information of the mobile phone 200. For example, the profile picture e.

It should be noted that, for a method for "obtaining, by the second terminal from the profile picture that is of the owner of the second terminal and that is saved on the second terminal or a cloud server, the profile picture that corresponds to the current scenario information of the second terminal" in this application, refer to the foregoing method for obtaining, by the first terminal, the profile picture that corresponds to the current scenario information of the first terminal. Details are not described herein.

S1803: The first terminal receives the second profile picture of the owner of the second terminal that is sent by the second terminal.

The first terminal and the second terminal may transmit the profile picture (for example, the second profile picture) by using a wireless short-haul connection between the first terminal and the second terminal. The wireless short-haul communication connection in this application may be a communication connection established by using a wireless short-haul communications technology.

For example, the wireless short-haul communication connection may be a Bluetooth (Bluetooth, BT) connection or a Wi-Fi connection, or may be another wireless short-haul communication connection, for example, an infrared connection, a short-haul wireless communications technology (Near Field Communication, NFC) connection, an ultra-wideband connection, a ZigBee protocol (ZigBee) connection, and a Bluetooth low energy (Bluetooth Low Energy, BLE) connection. This is not specifically limited in this application. The Wi-Fi connection may be a Wi-Fi direct connection, namely, a peer-to-peer connection between Wi-Fi devices.

S1804: The first terminal displays, in response to receiving the second profile picture of the owner of the second terminal, the first screen that includes the second profile picture.

In the process in which the first terminal performs voice communication with the second terminal, if the first terminal receives the second profile picture sent by the second terminal, the first terminal may display, in response to an operation of "receiving the second profile picture", the voice call screen that includes the second profile picture.

Figure 19:
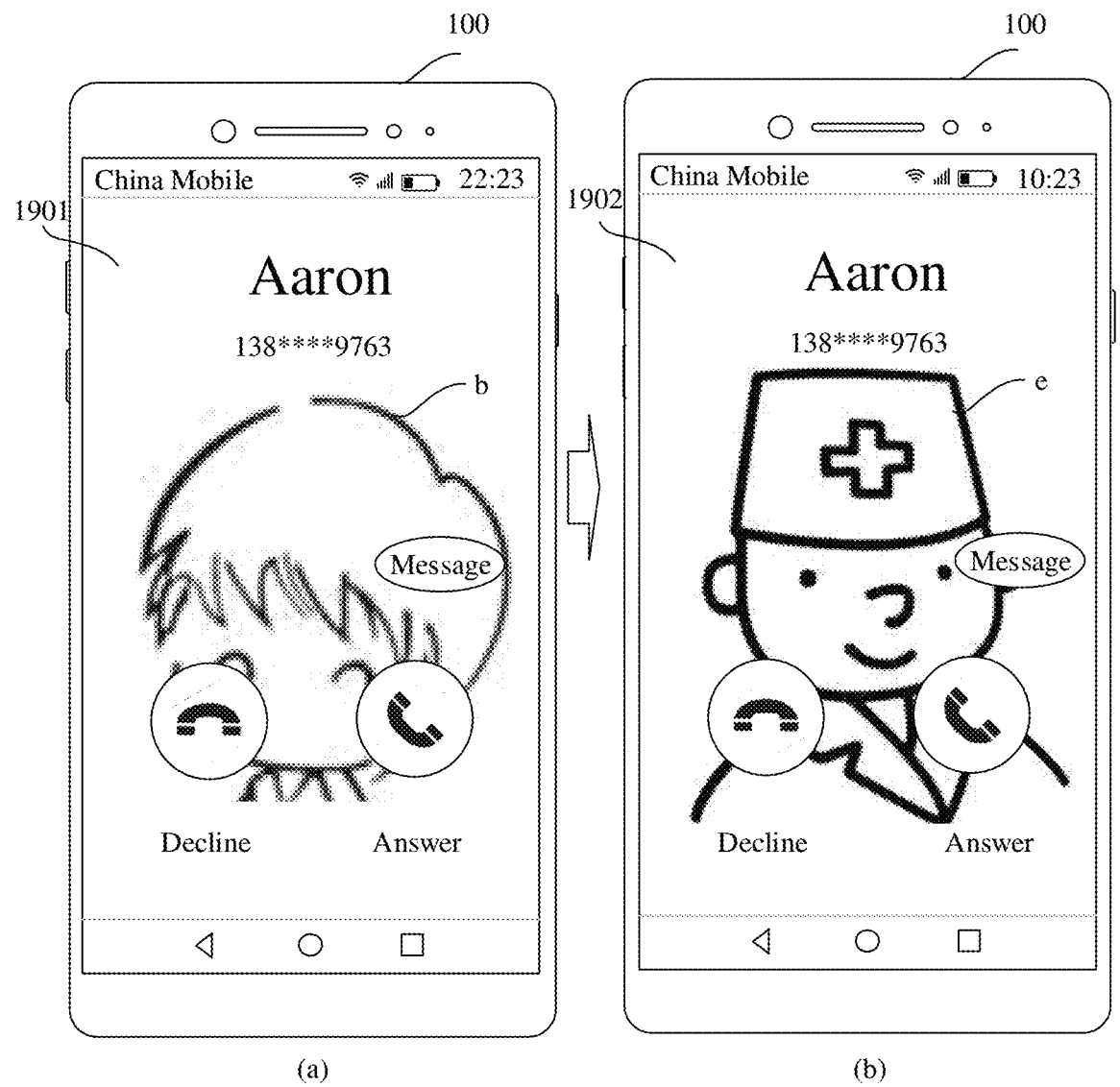
FIG. 19 is a schematic diagram 12 of an example of a display screen of a terminal according to this application.

For example, in response to receiving the profile picture e of a first contact Aaron sent by the mobile phone 200, the mobile phone 100 may display a "first screen" 1902 shown in (b) in FIG. 19. The "first screen" 1902 includes the profile picture e (namely, the second profile picture) of the owner Aaron of the second terminal.

According to the profile picture display method provided in this application, in the process in which the first terminal performs voice communication with the second terminal, the first terminal may receive and display the second profile picture sent by the second terminal. In other words, the first terminal and the second terminal may share their respective profile pictures in the voice communication process in this application.

Figure 18:
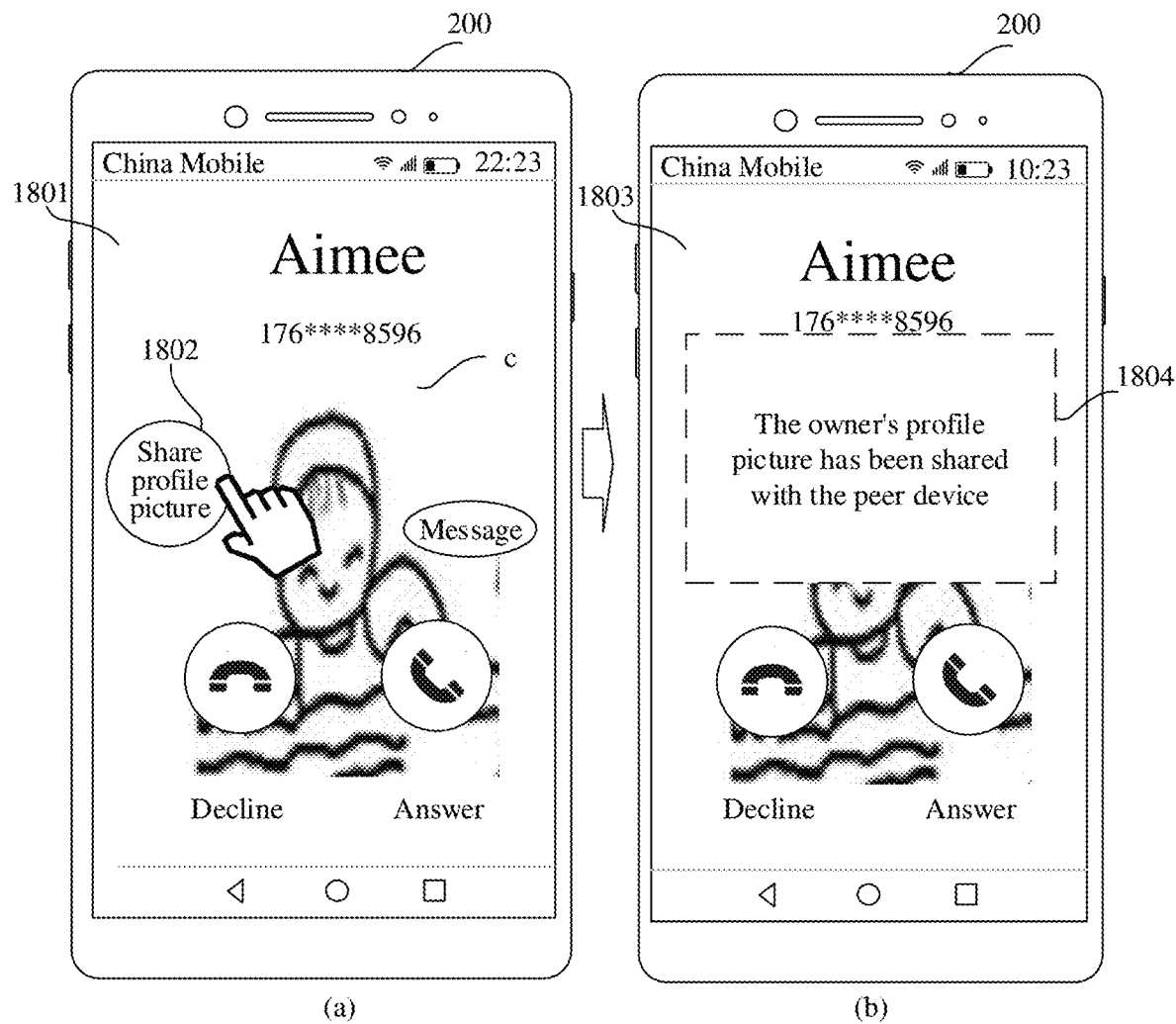
FIG. 18 is a schematic diagram 11 of an example of a display screen of a terminal according to this application.

Optionally, after sending the second profile picture of the owner of the second terminal to the first terminal, the second terminal may further display a prompt window indicating that information is successfully sent. The prompt window is used to indicate that the second terminal has sent the second profile picture of the owner of the second terminal to the first terminal. For example, the mobile phone 200 may display a prompt window 1804 indicating that information shown in (b) in FIG. 18 is successfully sent.

Further, after receiving the second profile picture sent by the second terminal, the first terminal may not immediately display the first screen that includes the second profile picture, but display a third screen that includes first prompt information. The first prompt information is used to prompt the user whether to set the second profile picture as the profile picture of the first contact. Specifically, S1804 may be replaced with S1804a and S1804b.

S1804a: The first terminal displays, in response to receiving the second profile picture, a third screen that includes first prompt information, where the first prompt information is used to prompt the user whether to set the second profile picture as the profile picture of the owner of the second terminal.

For example, the first terminal is the mobile phone 100. After the mobile phone 100 performs S1702 and S1703, the mobile phone 100 may display a display screen shown in FIG. 20. The display screen shown in FIG. 20 includes "first prompt information" 2001, and the "first prompt information" 2001 may include prompt information "Are you sure you want to set profile picture e as Aaron's profile picture?" "Yes" is an option 2002 and "No" is an option 2003.

S1804*b*: The first terminal displays, in response to second input of the user for the first prompt information on the third screen, the first screen that includes the second profile picture.

Figure 20:
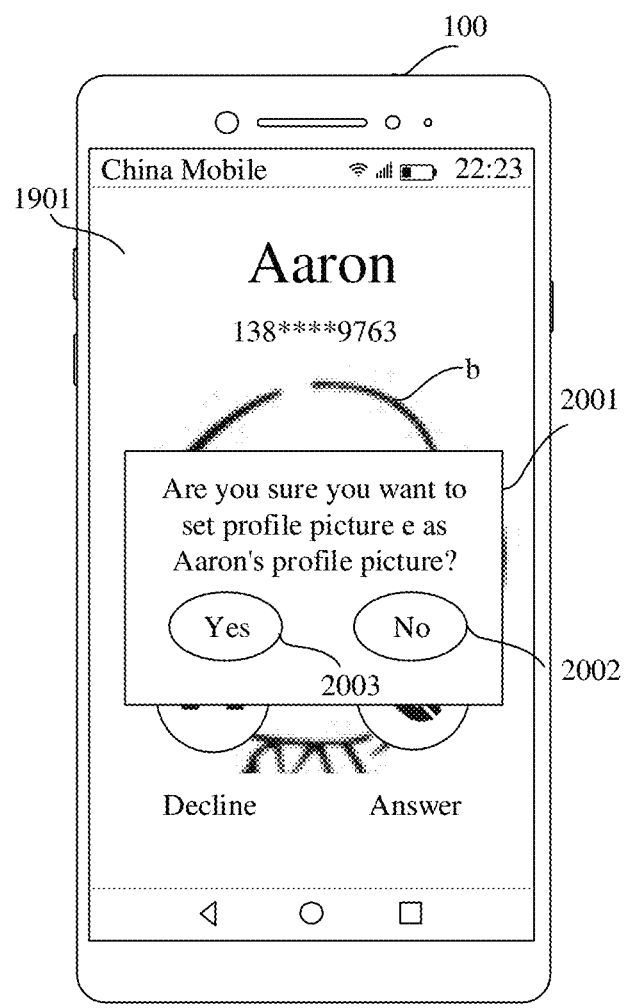
FIG. 20 is a schematic diagram 13 of an example of a display screen of a terminal according to this application.

For example, the second input performed by the user on the first prompt information on the third screen may be an instruction generated after the user taps the "Yes" option 2002 on the display screen shown in FIG. 20. The mobile phone 100 may display, in response to the instruction, a "call screen" 1902 shown in (b) in FIG. 19.

Further, the user may not want to refresh the profile picture of the owner of the second terminal on the first terminal. In this case, the S1804 may further include S1804*c*.

S1804*c*: The first terminal displays, in response to fourth input of the user for the first prompt information on the third screen, the first screen that includes the first profile picture, and sends a third message to the second terminal.

The third message is used to instruct the first terminal to refuse to set the second profile picture as the profile picture of the first contact.

For example, the fourth input may be an instruction generated after the user taps the "No" option 2003 on the display screen shown in FIG. 20. The mobile phone 100 may display, in response to the instruction, a "call screen" 1901 shown in (a) in FIG. 19.

Optionally, in a process in which the first terminal performs voice communication with different terminals, the first terminal sends different profile pictures to the terminals. For example, it is assumed that a user a uses a terminal A to perform voice communication with a terminal B of a user b. In a voice communication process, the terminal A may send, to the terminal B, a profile picture corresponding to current time information, current address information, and current status information of the user b. In a process in which the user a performs voice communication with a terminal C by using the terminal A, the user a may send, to the terminal C, a profile picture corresponding to current time information, current address information, and current status information of the user c.

It should be noted that, in the process in which the first terminal performs voice communication with the second terminal, the first terminal may not only share the profile picture of the owner of the first terminal with a peer end, but also share, with the peer end, a profile picture of a contact shared by the first terminal and the peer end. In other words, in the process in which the first terminal performs voice communication with the second terminal, the first terminal may share the profile picture of the first user (the owner and/or the contact) with the second terminal. For a method for sharing, by the first terminal and the second terminal, the profile picture of the contact shared by the first terminal and the second terminal, refer to the method for sharing, by the second terminal with the first terminal, the profile picture of the owner of the first terminal in S1701 to S1703. Details are not described herein.

Further, in the process in which the first terminal performs voice communication with the second terminal, the first terminal may not only share, with the peer end, the at least one profile picture of the first user, but also share, with the peer end, the scenario information corresponding to each profile picture, so that a peer device can display a corresponding profile picture based on the scenario information.

In another possible design method, in the process in which the first terminal performs voice communication with the second terminal, the current scenario information of the first terminal or the second terminal may change. The change in the scenario information herein in this application relates to changes in the time information, the address information, and the motion information or the emotion information. For example, in the process in which the first terminal performs voice communication with the second terminal, location information of the second terminal changes (for example, voice communication is performed in a process in which the owner of the second terminal takes a bus). In this case, the first terminal may monitor a change in the address information of the first user (namely, the owner of the second terminal) in real time, and refresh the profile picture of the first user displayed on the first screen of the first terminal. In other words, the first terminal displays, on the first screen, a third profile picture corresponding to changed address information. Specifically, after S502, the method in this application may further include S1901.

S1901: After detecting that the current scenario information of the first user changes, the first terminal displays the first screen that includes a third profile picture, where the third profile picture is a profile picture that is in the profile picture of the first user and that corresponds to changed scenario information.

For example, in this application, the second terminal may monitor a change in address information of the second terminal in real time. When a distance between a location of the second terminal currently obtained by the second terminal and a location of the second terminal previously obtained by the second terminal is greater than a preset threshold, the second terminal sends the currently obtained location of the second terminal to the first terminal, so that the first terminal can refresh the profile picture on the first screen of the first terminal. Alternatively, the first terminal may periodically send an address obtaining request to the second terminal, to obtain latest address information of the second terminal from the second terminal. When the distance between the currently obtained location of the second terminal and the previously obtained location of the second terminal is greater than the preset threshold, the first terminal refreshes the profile picture on the first screen of the first terminal.

Further, to avoid a case in which when the first terminal detects that the current scenario information of the first user changes and the first terminal receives the second profile picture sent by the second terminal, the first terminal cannot determine that the first terminal needs to display "a profile picture corresponding to changed scenario information", or display "the second profile picture pushed by the second terminal", the first terminal may set that in the voice communication process, a priority of a profile picture pushed by a peer end is higher than a priority of the profile picture corresponding to the changed scenario information in this application. Specifically, after S502, the method in this application may further include S2001.

S2001: After detecting that the current scenario information of the first user changes, and receiving the second profile picture of the owner of the second terminal that is sent by the second terminal, the first terminal displays, in response to receiving the second profile picture of the owner of the second terminal, the first screen that includes the second profile picture.

After detecting that the current scenario information of the first user changes, and receiving the second profile picture of the owner of the second terminal that is sent by the second terminal, the first terminal may preferentially display the second profile picture pushed by the second terminal. This helps the user that uses the first terminal communicate with a user that uses the second terminal.

In another possible design method, to avoid visual fatigue of the user caused by viewing a same profile picture on the first screen for a long time, the first terminal may further periodically refresh the profile picture of the first user on the first screen of the first terminal.

Optionally, in the process in which the first terminal performs voice communication with the second terminal, the profile picture shared by the second terminal with the first terminal includes but is not limited to the profile picture of the owner of the second terminal and/or a contact saved on the second terminal, and may further include a picture of a landmark building or a scenery picture of the location of the second terminal. For example, based on the foregoing example, it is assumed that Aaron of the mobile phone 200 is traveling in the Tian An Men Square in Beijing, in a process of performing voice communication between the mobile phone 200 and the mobile phone 100, the mobile phone 200 may send a picture of the Tian An Men Square in Beijing to the mobile phone 100. After receiving the picture, the mobile phone 100 may set the picture as Aaron's profile picture. Aimee who owns the mobile phone 100 may determine that Aaron is currently in Beijing.

Optionally, when the first terminal is in different modes, the first terminal may further set different profile pictures for the owner of the terminal. After receiving a voice paging request from another terminal, the first terminal may send a profile picture corresponding to a current mode to the another terminal. In this way, a user of the another terminal may determine a current status of the user by using the profile picture. For example, the first terminal may be in meeting, home, traveling, motion, and other modes.

Optionally, after S502, in the process in which the first terminal performs voice communication with the second terminal, the first terminal may further collect motion information of the owner of the first terminal by using a sensor, and send data related to the motion information or a profile picture corresponding to the motion information to the second terminal. For example, in the process in which the first terminal performs voice communication with the second terminal, the first terminal may collect motion data of the first terminal by using the motion sensor, and determine, based on the motion data, that the owner is running. In this case, the first terminal may send a profile picture corresponding to running to the second terminal, so that the second terminal may receive and display the profile picture corresponding to running, and the owner of the second terminal may determine a current status of the owner of the first terminal by using the profile picture. Alternatively, the first terminal may further push a quantity of steps of the owner of the first terminal, running-related physical exercise information, and the like to the second terminal, to urge the owner of the second terminal to do physical exercises.

Optionally, after S502, in the process in which the first terminal performs voice communication with the second terminal, the first terminal may further collect the emotion information of the owner of the first terminal by using a camera. For example, in the process in which the first terminal performs voice communication with the second terminal, the first terminal may collect a facial expression of the owner of the first terminal by using the camera, to determine the emotion information of the first terminal, and sends the emotion information or a profile picture corresponding to the emotion information to the second terminal. In this way, the owner of the second terminal may learn of an emotion change of the owner of the first terminal.

According to the profile picture display method provided in this application, in the process in which the first terminal performs voice communication with the second terminal, the first terminal may push different profile pictures to the second terminal based on the emotion change of the owner of the first terminal. In this way, the owner of the second terminal may not only speculate the emotion change of the owner of the first terminal based on a voice and tone change of the peer end, but also more directly and accurately learn of the emotion change of the owner of the first terminal based on the profile picture pushed by the first terminal. This facilitates communication between the users of the two terminals.

It can be understood that, to implement the foregoing functions, the terminal and the like include corresponding hardware structures and/or software modules for performing the functions. A person of ordinary skill in the art should easily be aware that, in combination with the examples described in the embodiments disclosed in this specification, units, algorithms, and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation falls beyond the scope of the embodiments of the present invention.

In the embodiments of this application, the terminal may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in this embodiment of the present invention, division into modules is an example, is merely logical function division, and may be other division in an actual implementation.

Figure 21:
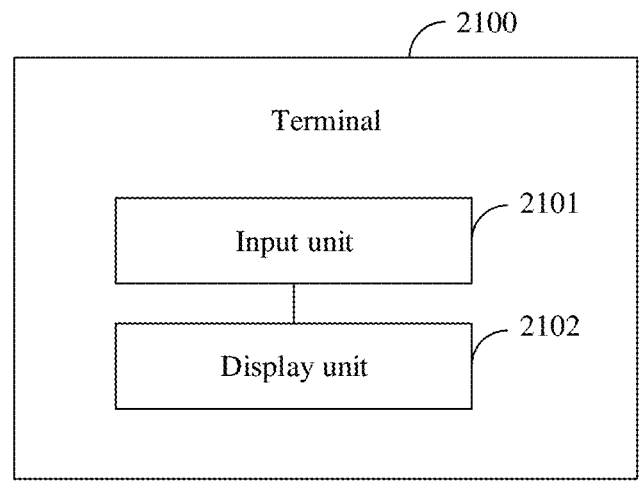
FIG. 21 is a schematic diagram 1 of structural composition of a terminal according to this application.

If functional modules obtained through division are in one-to-one correspondence with functions, FIG. 21 shows a possible schematic diagram of a structure of a terminal in the foregoing embodiments. The terminal 2100 includes an input unit 2101 and a display unit 2102. The input unit 2101 is configured to support the terminal to perform S501 in the method embodiments, and/or another process of the technology described in this specification. The terminal 2100 in this application may be the first terminal or the second terminal in the foregoing method embodiments.

The display unit 2102 is configured to support the terminal to perform the operations of displaying the first screen that includes the first profile picture in S502, S601, S601b to S601c, and S1804c, and the operations in S801, S1804, S1804a, S1804b, S1901, S2001, and S707 to S711 in the method embodiments, and/or another process of the technology described in this specification.

Figure 22:
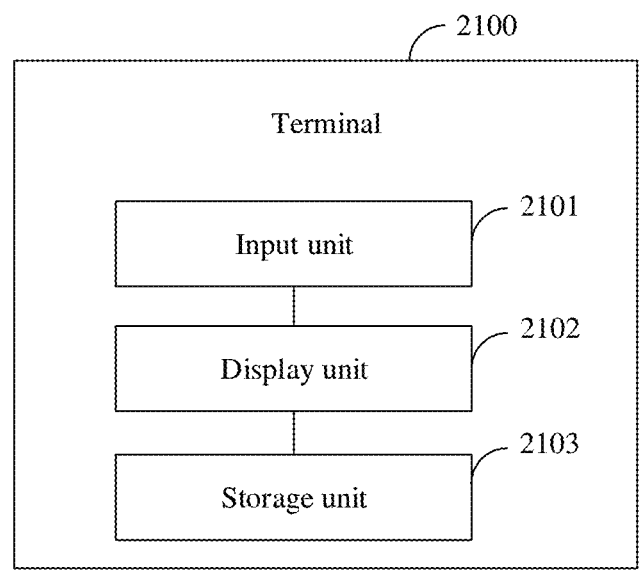
FIG. 22 is a schematic diagram 2 of structural composition of a terminal according to this application.

Further, as shown in FIG. 22, the terminal 2100 may further include a storage unit 2103. The storage unit 2103 is configured to support the terminal to perform S8o2 in the method embodiments, and/or another process of the technology described in this specification.

Further, the terminal 2100 may further include a first communications unit. The first communications unit is configured to perform voice communication with another terminal (for example, the second terminal), and/or another process of the technology described in this specification.

Further, the terminal 2100 may further include a second communications unit. The second communications unit is configured to support the terminal to perform S1602, S1605, S1701, S1702, and S1803 in the method embodiments, and/or another process of the technology described in this specification.

Optionally, the first communications unit may support the terminal to perform S1602, S1605, S1701, S1702, S1803, and the like in the method embodiments All related content of the steps in the foregoing method embodiments may be cited in function descriptions of a corresponding functional module. Details are not described herein again.

Certainly, the terminal 2100 includes but is not limited to the units and modules listed above. For example, the terminal 2100 may further include a calculation unit. The calculation unit is configured to calculate touch point coordinates corresponding to input of the user on a screen displayed by the display unit. The terminal 2100 may further include a search unit. The search unit is configured to support the terminal to perform the operation of "sequentially searching, in descending order of priorities of the time information and the address information, for the first profile picture" in S601 and S601b and S601c in the method embodiments, and/or another process of the technology described in this specification. The terminal 2100 may further include a determining module. The determining module is configured to support the terminal to perform S601a and S702 to S706 in the method embodiments, and/or another process of the technology described in this specification. The terminal 2100 may further include an obtaining module. The obtaining module is configured to support the terminal to perform S1610 in the method embodiments, and/or another process of the technology described in this specification.

In addition, functions that the functional units can specifically implement include but are not limited to the functions corresponding to the method steps in the foregoing examples. For detailed descriptions about other units of the terminal 2100, refer to the detailed descriptions about the method steps corresponding to the units. Details are not described again herein.

When an integrated unit is used, the input unit 2101, the calculation unit, and the like may be integrated into one processing module. The first communications unit may be an RF circuit of the terminal, and the second communications unit may be a Wi-Fi module, a Bluetooth module, or the like of the terminal, and the first communications unit and the second communications unit may be collectively referred to as a communications module. The storage unit may be a storage module of the terminal, and the display module may be a display module such as a touchscreen.

Figure 23:
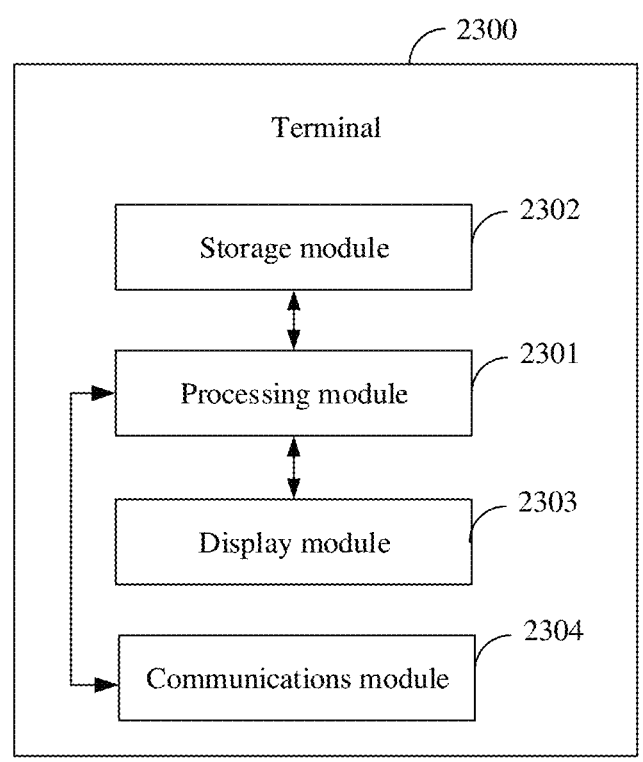
FIG. 23 is a schematic diagram 3 of structural composition of a terminal according to this application.

FIG. 23 is a schematic diagram of a possible structure of the terminal in the foregoing embodiments. The terminal 2300 includes a processing module 2301, a storage module 2302, a display module 2303, and a communications module 2304. The processing module 2301 is configured to perform control management on an action of the terminal. The display module 2303 is configured to display an image generated by the processing module 2301. The storage module 2302 is configured to save program code and data of the terminal. The communications module 2304 is configured to communicate with another terminal. For example, the communications module 2304 is configured to perform voice communication with another terminal, and receive a profile picture from or send a profile picture to another terminal.

The processing module 2301 may be a processor or a controller, for example, may be a central processing unit (Central Processing Unit, CPU), a general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. The controller/processor may implement or execute various example logical blocks, modules, and circuits described with reference to content disclosed in the present invention. The processor may also be a combination implementing a computing function, for example, a combination of one or more microprocessors, or a combination of a DSP and a microprocessor. The communications module 2304 may be a transceiver, a transceiver circuit, a communications interface, or the like. The storage module 2302 may be a memory.

When the processing module 2301 is the processor (for example, the processor 480 shown in FIG. 4), the communications module 2304 is an RF transceiver circuit (for example, the radio frequency circuit 410 shown in FIG. 4), and the storage module 2302 is a memory (for example, the memory 420 shown in FIG. 4). When the display module 2303 is a touchscreen (including the touch panel 431 and the display panel 441 shown in FIG. 4), the terminal provided in this embodiment of the present invention may be the terminal 100 shown in FIG. 4. The communications module 2304 may include not only the RF transceiver circuit, but also the Wi-Fi module and the Bluetooth module. The communications modules such as the RF transceiver circuit, the Wi-Fi module, and the Bluetooth module may be collectively referred to as a communications interface. The processor, the communications interface, the touchscreen, and the storage area may be coupled together by using a bus.

Refer to FIG. 1 to FIG. 3, FIG. 5B, FIG. 6, FIG. 10A to FIG. 15, and FIG. 18 to FIG. 20. An embodiment of this application further provides a graphical user interface (GUI). The GUI is saved on a terminal. The terminal includes a touchscreen, a memory, a processor, and a communications interface. The processor is configured to execute one or more computer programs saved in the memory. The GUI includes: displaying on the touchscreen, in response to first input, a first screen that includes a first profile picture, where the first input is used to instruct the first terminal to display the first screen that includes a profile picture of a first user; the first user is an owner of the first terminal or a contact saved on the first terminal; the first profile picture is a profile picture that is in the profile picture of the first user and that corresponds to current scenario information of the first user; the current scenario information of the first user includes at least one of current time information, current address information, and current status information of the first user; the current status information of the first user includes at least one of current motion information and current emotion information of the first user; and the first screen is any one of a contact screen, an SMS message screen, or a voice call screen.

Further, the GUI further includes: before displaying the first screen on the touchscreen, displaying a second screen on the touchscreen, where the second screen includes a profile picture selection option and at least one scenario setting option of the first user, the profile picture selection option is used to set a profile picture for the first user, and the at least one scenario setting option is used to set scenario information corresponding to the profile picture set for the first user.

Further, the first screen is a voice call screen used by the communications interface to perform voice communication with a second terminal, and the first profile picture is a profile picture of an owner of the second terminal. The GUI further includes: after displaying the first screen on the touchscreen, displaying on the touchscreen, in response to receiving a second profile picture of the owner of the second terminal, the first screen that includes the second profile picture.

Further, the GUI further includes: displaying on the touchscreen, in response to receiving the second profile picture, a third screen that includes first prompt information, where the first prompt information is used to prompt a user whether to set the second profile picture as the profile picture of the owner of the second terminal; and displaying on the touchscreen, in response to second input for the first prompt information on the third screen, the first screen that includes the second profile picture, where the second input is used to instruct the first terminal to refresh the first profile picture to the second profile picture.

Further, the first screen is a voice call screen used by the communications interface to perform voice communication with at least two second terminals, and the first profile picture is a profile picture of a preset owner in owners of the at least two second terminals.

Further, the GUI further includes: after displaying, on the touchscreen, the first screen that includes the first profile picture, if the processor detects that the current scenario information of the first user changes, displaying, on the touchscreen, the first screen that includes a third profile picture, where the third profile picture is a profile picture that is in the profile picture of the first user and that corresponds to changed scenario information.

Further, the first screen is the voice call screen used by the communications interface to perform voice communication with the at least two second terminals, and the first profile picture is a profile picture of an owner of the second terminal. The GUI further includes: after displaying, on the touchscreen, the first screen that includes the first profile picture, if the processor detects that the current scenario information of the first user changes, and the communications interface receives the second profile picture of the owner of the second terminal that is sent by the second terminal, displaying, on the touchscreen, in response to receiving, by the communications interface, the second profile picture of the owner of the second terminal, the first screen that includes the second profile picture.

This application further provides a computer storage medium, where the computer storage medium saves computer program code. When the processor executes the computer program code, the terminal performs related method steps in any one of FIG. 5A, FIG. 7, FIG. 8, FIG. 9, FIG. 16, and FIG. 17 to implement the profile picture display method in the foregoing embodiments.

This application further provides a computer program product. When the computer program product runs on a computer, the computer is enabled to perform related method steps in any one of FIG. 5A, FIG. 7, FIG. 8, FIG. 9, FIG. 16, and FIG. 17 to implement the profile picture display method in the foregoing embodiments.

The terminal 2100, the terminal 2300, the computer storage medium, and the computer program product provided in this application are all configured to perform the corresponding methods provided in the foregoing. Therefore, for advantageous effects that can be achieved by the terminal 2100, the terminal 2300, the computer storage medium, and the computer program product, refer to the advantageous effects of the corresponding methods provided in the foregoing. Details are not described herein again.

The foregoing descriptions about implementations allow a person skilled in the art to understand that, for ease of description and brevity, division of the foregoing functional modules is used as an example for illustration. In an actual application, the foregoing functions may be allocated to different functional modules and implemented as required, in other words, an inner structure of an apparatus is divided into different functional modules to implement all or some of the functions described above. For a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the modules or units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be saved in a computer-readable storage medium. Based on such an understanding, the technical solutions of this application essentially, or the part contributing to the prior art, or all or some of the technical solutions may be implemented in the form of a software product. The software product is saved in a storage medium and includes several instructions for instructing a computer device (which may be a personal computer, a server, or a network device) to perform all or some of the steps of the methods described in the embodiments of this application. The foregoing storage medium includes: any medium that can save program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:

receiving, by a first terminal, a first input, wherein the first input instructs the first terminal to display a first screen that comprises a profile picture of a first user, the first user is an owner of the first terminal or a contact saved on the first terminal, and the first screen is a voice call screen usable by the first terminal to perform voice communication with a second terminal;

searching, by the first terminal in response to the first input, for a profile picture of the first user that corresponds to current scenario information of the first user, to identify a first profile picture of the first user, wherein the current scenario information of the first user comprises current time information, current address information, or current status information of the first user, the current status information of the first user comprises current motion information or current emotion information of the first user, and wherein the first profile picture is a profile picture of an owner of the second terminal;

displaying, by the first terminal in response to the first input, the first screen comprising the first profile picture of the first user;

after displaying, by the first terminal in response to the first input, the first screen comprising the first profile picture, and in a process of performing voice communication with the second terminal, receiving, by the first terminal, a second profile picture of the owner of the second terminal that is sent by the second terminal; and displaying, by the first terminal in response to receiving the second profile picture of the owner of the second terminal, the first screen comprising the second profile picture, the displaying of the first screen comprising the second profile picture comprising:

displaying, by the first terminal in response to receiving the second profile picture, a third screen that comprises first prompt information, wherein the first prompt information prompts whether to set the second profile picture as the profile picture of the owner of the second terminal; and displaying, by the first terminal in response to second input corresponding to the first prompt information on the third screen, the first screen comprising the second profile picture, wherein the second input instructs the first terminal to change the first profile picture to the second profile picture.

2. The method according to claim 1, wherein the first terminal saves at least two profile pictures of the first user and scenario information corresponding to each profile picture of the at least two profile pictures, and the first profile picture is one of the at least two profile pictures.

3. The method according to claim 1, wherein before receiving, by the first terminal, the first input, the method further comprises:

displaying, by the first terminal, a second screen, wherein the second screen comprises a profile picture selection option and at least one scenario setting option of the first user, the profile picture selection option is usable to select a target profile picture for the first user, and the at least one scenario setting option is usable to set scenario information corresponding to the target profile picture selected for the first user; and in response to input of a user corresponding to the profile picture selection option and the at least one scenario setting option, saving, by the first terminal, the target profile picture selected for the first user and the scenario information corresponding to the target profile picture selected for the first user.

4. The method according to claim 1, further comprising:

sending, by the first terminal, to the second terminal in response to third input on the first screen, a profile picture of the owner of the first terminal that corresponds to current scenario information of the owner of the first terminal.

5. The method according to claim 1, wherein:

the current scenario information of the first user comprises the current time information or the current address information of the first user; and after displaying, by the first terminal in response to the first input, the first screen comprising the first profile picture, the method further comprises:

sending, by the first terminal to the second terminal in response to third input on the first screen, a profile picture of the owner of the first terminal that corresponds to current scenario information of the owner of the second terminal.

6. The method according to claim 1, wherein:

the current scenario information of the first user comprises the current time information and the current address information of the first user;

the current time information comprises specific time information, day time information, month time information, and year time information, the specific time information comprises a special date, a holiday, and a solar term, a priority of the specific time information is $D_1$, the day time information comprises a plurality of fixed periods of one day, a priority of the day time information is $D_2$, the month time information comprises a plurality of fixed periods of one month, a priority of the month time information is $D_3$, the year time information comprises each month and each quarter of one year, a priority of the year time information is $D_4$, and $D_1>D_2>D_3>D_4$;

the current address information comprises at least two levels of address range information, and priorities of the at least two levels of address range information decrease in ascending order of address ranges; and searching, by the first terminal in response to the first input, for a profile picture of the first user that corresponds to current scenario information of the first user, to identify a first profile picture of the first user, comprises:

in response to the first input, sequentially searching, by the first terminal in descending order of priorities of the current time information and the current address information, for the first profile picture of the first user that corresponds to the current scenario information, and displaying the first screen comprising the first profile picture after finding the first profile picture for a first time.

7. The method according to claim 6, wherein in response to the first input, sequentially searching, by the first terminal in descending order of the priorities of the current time information and the current address information, for the first profile picture of the first user that corresponds to the current scenario information, and displaying the first screen comprising the first profile picture after finding the first profile picture for the first time comprises:
    in response to the first input, performing the following:
        when a priority corresponding to the current time information is higher than a priority corresponding to the current address information, sequentially searching, by the first terminal in descending order of the priorities of the current time information, for the first profile picture of the first user that corresponds to the current time information, and displaying the first screen comprising the first profile picture after finding the first profile picture for the first time; and
        when the priority corresponding to the current address information is higher than the priority corresponding to the current time information, sequentially searching, by the first terminal in descending order of the priorities of the current address information, for the first profile picture of the first user that corresponds to the current address information, and displaying the first screen comprising the first profile picture after finding the first profile picture for the first time.

8. The method according to claim 1, wherein the first screen is a voice call screen usable by the first terminal to perform voice communication with at least two second terminals, and the first profile picture is a profile picture of a preset owner in owners of the at least two second terminals.

9. The method according to claim 1, wherein after displaying, by the first terminal in response to the first input, the first screen comprising the first profile picture, the method further comprises:
    displaying, by the first terminal after detecting that the current scenario information of the first user has changed, the first screen comprising a third profile picture, wherein the third profile picture is of the first user and corresponds to changed scenario information.

10. The method according to claim 1, wherein:
    the second profile picture of the owner of the second terminal is received after detecting, by the first terminal, that the current scenario information of the first user has changed.

11. A terminal, configured to act as a first terminal, the terminal comprising:
    an interface, configured to receive first input, wherein the first input instructs the first terminal to display a first screen that comprises a profile picture of a first user, the first user is a contact saved on the first terminal, and the first screen is a voice call screen usable by the first terminal to perform voice communication with a second terminal;
    a processor; and
    a non-transitory computer-readable storage medium storing a program to be executed by the processor, the program including instructions for:
        searching, in response to the first input, for a profile picture of the first user that corresponds to current scenario information of the first user, to identify a first profile picture of the first user, wherein the current scenario information of the first user comprises current time information, current address information, or current status information of the first user, the current status information of the first user comprises current motion information or current emotion information of the first user, and the first profile picture is a profile picture of an owner of the second terminal; and
    a display, configured to display the first screen in response to the first input, the first screen comprising the first profile picture of the first user;
    wherein the interface is further configured to, in a process of performing voice communication with the second terminal, receive a second profile picture of the owner of the second terminal that is sent by the second terminal; and
    wherein the display is further configured to display, in response to the interface receiving the second profile picture of the owner of the second terminal, the first screen comprising the second profile picture, the displaying of the first screen comprising the second profile picture comprising:
        displaying, in response to receiving the second profile picture, a third screen that comprises first prompt information, wherein the first prompt information prompts whether to set the second profile picture as the profile picture of the owner of the second terminal; and
        displaying, in response to second input corresponding to the first prompt information on the third screen, the first screen comprising the second profile picture, wherein the second input instructs the first terminal to change the first profile picture to the second profile picture.

12. The terminal according to claim 11, wherein the first terminal saves at least two profile pictures of the first user and scenario information corresponding to each profile picture of the at least two profile pictures, and the first profile picture is one of the at least two profile pictures.

13. The terminal according to claim 11, wherein:
    the display is further configured to display a second screen, wherein the second screen comprises a profile picture selection option and at least one scenario setting option of the first user, the profile picture selection option is usable to select a target profile picture for the first user, and the at least one scenario setting option is used to set scenario information corresponding to the target profile picture selected for the first user; and
    the program further includes instructions for:
        in response to the interface receiving input corresponding to the profile picture selection option and the at least one scenario setting option, saving the target profile picture selected for the first user and the scenario information corresponding to the target profile picture selected for the first user.

14. The terminal according to claim 11, wherein the program further includes instructions for:
    after displaying, by the first terminal in response to the first input, the first screen comprising the first profile picture, sending, to the second terminal in response to third input on the first screen, a profile picture that is in the profile picture of the owner of the first terminal and that corresponds to current scenario information of the owner of the first terminal.

15. The terminal according to claim 11, wherein:
    the current scenario information of the first user comprises the current time information or the current address information of the first user; and
    the program further includes instructions for:
        after the display displays, in response to the first input, the first screen comprising the first profile picture, sending, to the second terminal in response to third input on the first screen, a profile picture of the owner of the first terminal that corresponds to current scenario information of the owner of the second terminal.

\* \* \* \* \*